United States Patent
Hong et al.

(10) Patent No.: US 12,348,284 B2
(45) Date of Patent: Jul. 1, 2025

(54) BEAMFORMING METHOD AND APPARATUS USING DEEP NEURAL NETWORK IN WIRELESS COMMUNICATION SYSTEM

(71) Applicant: ELECTRONICS AND TELECOMMUNICATIONS RESEARCH INSTITUTE, Daejeon (KR)

(72) Inventors: Seung Eun Hong, Daejeon (KR); Jun Beom Kim, Daejeon (KR); Seok Hwan Park, Daejeon (KR); Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 126 days.

(21) Appl. No.: 18/458,605

(22) Filed: Aug. 30, 2023

(65) Prior Publication Data
US 2024/0088952 A1   Mar. 14, 2024

(30) Foreign Application Priority Data
Aug. 30, 2022   (KR) .................. 10-2022-0109203

(51) Int. Cl.
*H04B 7/0426*  (2017.01)
*H04B 17/391*  (2015.01)

(52) U.S. Cl.
CPC ......... *H04B 7/043* (2013.01); *H04B 17/3913* (2015.01)

(58) Field of Classification Search
CPC .. H04B 7/043; H04B 17/3913; H04B 7/0695; H04B 7/0617; H04B 7/06952; H04B 7/0452; H04B 7/088; G06N 3/04; G06N 3/08
See application file for complete search history.

(56) References Cited

U.S. PATENT DOCUMENTS

| | | | |
|---|---|---|---|
| 10,944,453 B2 | 3/2021 | Armand et al. | |
| 11,304,063 B2 | 4/2022 | Moon et al. | |
| 11,399,303 B2 * | 7/2022 | Bedekar | H04W 8/24 |
| 2018/0227026 A1 | 8/2018 | Kim et al. | |
| 2021/0241090 A1 | 8/2021 | Chen et al. | |
| 2021/0328630 A1 | 10/2021 | Ryu et al. | |
| 2021/0384953 A1 | 12/2021 | Shental | |
| 2022/0014246 A1 | 1/2022 | Zhu et al. | |
| 2022/0029665 A1 | 1/2022 | Hong et al. | |
| 2022/0036171 A1 | 2/2022 | Ge et al. | |
| 2022/0216905 A1 | 7/2022 | Zhang et al. | |

* cited by examiner

*Primary Examiner* — Vineeta S Panwalkar
(74) *Attorney, Agent, or Firm* — Rabin & Berdo, P.C.

(57) ABSTRACT

The present disclosure discloses beamforming methods and apparatuses. According to an exemplary embodiment of the present disclosure, an antenna message generation deep neural network (DNN) and a beam characteristic generation DNN of a bipartite graph neural network (BGNN) having terminals as vertices on one side and APs as vertices on another side may be constructed.

18 Claims, 20 Drawing Sheets

BEAMFORMING METHOD AND APPARATUS USING DEEP NEURAL NETWORK IN WIRELESS COMMUNICATION SYSTEM

CROSS-REFERENCE TO RELATED APPLICATIONS

This application claims priority to Korean Patent Applications No. 10-2022-0109203, filed on Aug. 30, 2022, with the Korean Intellectual Property Office (KIPO), the entire contents of which are hereby incorporated by reference.

BACKGROUND

1. Technical Field

Exemplary embodiments of the present disclosure relate to a beamforming technique in a wireless communication system, and more specifically, to a beamforming technique using a deep neural network.

2. Related Art

In order to cope with continuing increase in wireless traffic, beamforming techniques have been introduced that can simultaneously transmit multiple user data in space using multiple antennas. When multiple user data is transmitted simultaneously in space using multiple antennas, interference between users also increases. Therefore, the performance of wireless systems can be increased only when interference can be controlled. In order to properly control interference, channel information between multiple antennas and users should be utilized.

Recently, a distributed MIMO system consisting of a central unit and a plurality of distributed access units has been proposed, such as a cloud radio access network (C-RAN) and a cell-free massive MIMO system. The distributed MIMO system utilizes channel information between distributed antennas and users to calculate beamforming vectors that coordinate interference between the users, and simultaneously transmits data to the users based on the beamforming vectors. In the distributed MIMO system, performance such as a total data rate or a minimum user data rate can be maximized by simultaneously transmitting the data to the users based on the beamforming vectors.

As the size of the wireless network, that is, the number of antennas and the number of users, increases, the amount of channel information increases. Therefore, in the wireless communication system using beamforming, beamforming vector calculation based on channel information becomes complicated. Calculation of the optimal beamforming vectors that increase the total data rate or minimum user data rate performance of the wireless communication system may only derive the optimal solution through an iterative calculation process. Therefore, in general, as the network size increases, a time required to derive a final solution increases rapidly, and the solution is not derived in real time (i.e., until the channel information used to calculate the beamforming vectors is maintained).

Recently, deep learning schemes have been introduced to solve such the real-time problem of optimization techniques for beamforming. The deep learning schemes use deep neural networks to model an iterative process of radio resource management algorithms. The deep learning schemes in deep neural network training may include a supervised learning scheme that learns known labels (generally, results derived through the iterative calculation described above), and an unsupervised learning scheme that optimizes system performance without labels. The supervised learning scheme inevitably has performance limitations on algorithms that generate the labels. Therefore, the unsupervised learning scheme without performance limitations is preferred. The deep learning-based optimization schemes have triggered various studies on beamforming optimization of wireless systems.

However, despite excellent performance and low computational complexity, the existing deep learning-based beamforming solutions lack scalability to the network size. In other words, a deep neural network trained at a specific number of antennas and users is not applicable to a system with a different network size. In order to apply the deep learning scheme to systems with various network sizes, multiple deep neural networks trained exclusively for specific network sizes are respectively required. Accordingly, approaches using unsupervised learning to apply to systems with various network sizes result in prohibitively high training complexity and memory requirements.

SUMMARY

Exemplary embodiments of the present disclosure are directed to providing a network size-adaptive deep neural network architecture applicable to an arbitrary wireless system through a single training process.

A method according to the present disclosure for achieving the above-described objective, as a method of an access point (AP), may comprise: constructing a bipartite graph neural network (BGNN) constituting antenna message generation deep neural networks (DNNs) corresponding to a number of antennas of the AP, user message generation DNNs corresponding to a number of users communicating with the AP, and beam characteristic generation DNNs corresponding to the number of users; a first step of providing, by each of the user message generation DNNs and to the antenna message generation DNNs, a first message including beam characteristic-related information of a reception beam received at the antenna of the AP; a second step of providing, by each of the antenna message generation DNNs and to the beam characteristic generation DNNs, a second message including first information based on the first message and beam characteristic-related information of a transmission beam; a third step of determining, by each of the beam characteristic generation DNNs, beam characteristics for each of the users based on the second message; and performing beamforming to each of the users based on the determined beam characteristics.

The first to third steps may be iterated a predetermined number of times.

The first message may include information related to past beam characteristics, information related to the second message in past, and information on a wireless link propagation gain between a specific antenna and a specific user.

The first information may be a value calculated by summing all the first messages received from the users.

The second message may include second information related to a transmission beam between a specific antenna among the antennas of the AP and a specific user among the users, and third information related to transmission beams toward all users other than the specific user.

The method may further comprise: training the BGNN, wherein the training of the BGNN comprises: determining a network size based on the number of antennas of the AP and the number of users; constructing a mini-batch set based on a product of a number of training epochs and a number of mini-batches used in one epoch; performing learning using the BGNN for each mini-batch in the mini-batch set; and updating the respective DNNs of the BGNN based on a result of the learning.

Parameters of all DNNs constituting the BGNN may be set to values pre-trained offline.

The method may further comprise: when the number of users communicating with the AP changes, updating the user message generation DNNs and the beam characteristic generation DNNs based on the number of users.

The method may further comprise: when the number of antennas of the AP changes, updating the number of antenna message generation DNNs based on the changed number of antennas.

A method according to the present disclosure, as a method of a terminal, may comprise: constructing a user message generation deep neural network (DNN) and a beam characteristic generation DNN of a bipartite graph neural network (BGNN) having distributed access points (APs) as vertices on one side and terminals as vertices on another side; a first step of transmitting, by the user message generation DNN and to the APs, a first message including beam characteristic-related information of each of reception beams received from the APs; a second step of receiving, from the APs, a second message including first information based on the first message and beam characteristic-related information of transmission beams; and determining, by the beam characteristic generation DNN, beam characteristics based on the second message, wherein the APs constituting the BGNN includes antenna message generation DNNs corresponding to a number of antennas of the APs, respectively.

The method may further comprise: transmitting the determined beam characteristics to the APs.

The beam characteristics may be determined by iterating the first step and the second step a preset number of times.

The first message may include information related to past beam characteristics, information related to the second message in past, and information on a wireless link propagation gain between a specific antenna and a specific user.

The second message may include second information related to a transmission beam between a specific antenna among the antennas of the AP and a specific user among the users, and third information related to transmission beams toward all users other than the specific user.

A method according to the present disclosure, as a method of an AP, may comprise: constructing an antenna message generation deep neural network (DNN) of a bipartite graph neural network (BGNN) having terminals as vertices on one side and APs including the AP and communicating with the terminals as vertices on another side; receiving, from each of the terminals, a first message including beam characteristic-related information of a reception beam of the each of the terminals; transmitting, by the antenna message generation DNN and to each of the terminals, a second message including first information based on the first message and beam characteristic-related information of a transmission beam; receiving beam characteristic information from each of the terminals; and performing beamforming for each of the terminals based on the beam characteristic information, wherein each of the terminals includes a user message generation DNN and a beam characteristic generation DNN constituting the BGNN.

The first message may include information related to past beam characteristics, information related to the second message in past, and information on a wireless link propagation gain between a specific antenna and a specific user, and the first information may be a value calculated by summing all the first messages received from the users.

The second message may include second information related to a transmission beam between an antenna of the AP and a specific user among the users, and third information related to transmission beams toward all users other than the specific user.

The method may further comprise: when a number of antennas of the AP changes, updating the number of antenna message generation DNNs based on the changed number of antennas.

The BGNN according to the present disclosure may be composed of three types of reusable component DNNs that characterize calculation processes of antenna vertices and user vertices. Changes in configurations of antennas and users can be easily reflected in the BGNN by removing or adding the corresponding DNN modules. In particular, the BGNN according to the present disclosure has dimensionality-invariant calculation characteristics so that it can be universally applied to any communication system. In addition, such the universal characteristics can be further improved using a proposed training policy for including multiple random bipartite graphs as training samples. According to the present disclosure, real-time beamforming optimization is made possible even for any wireless network that is not used for training, and can also be applied to a distributed MIMO system.

DETAILED DESCRIPTION OF THE EMBODIMENTS

Figure 1:
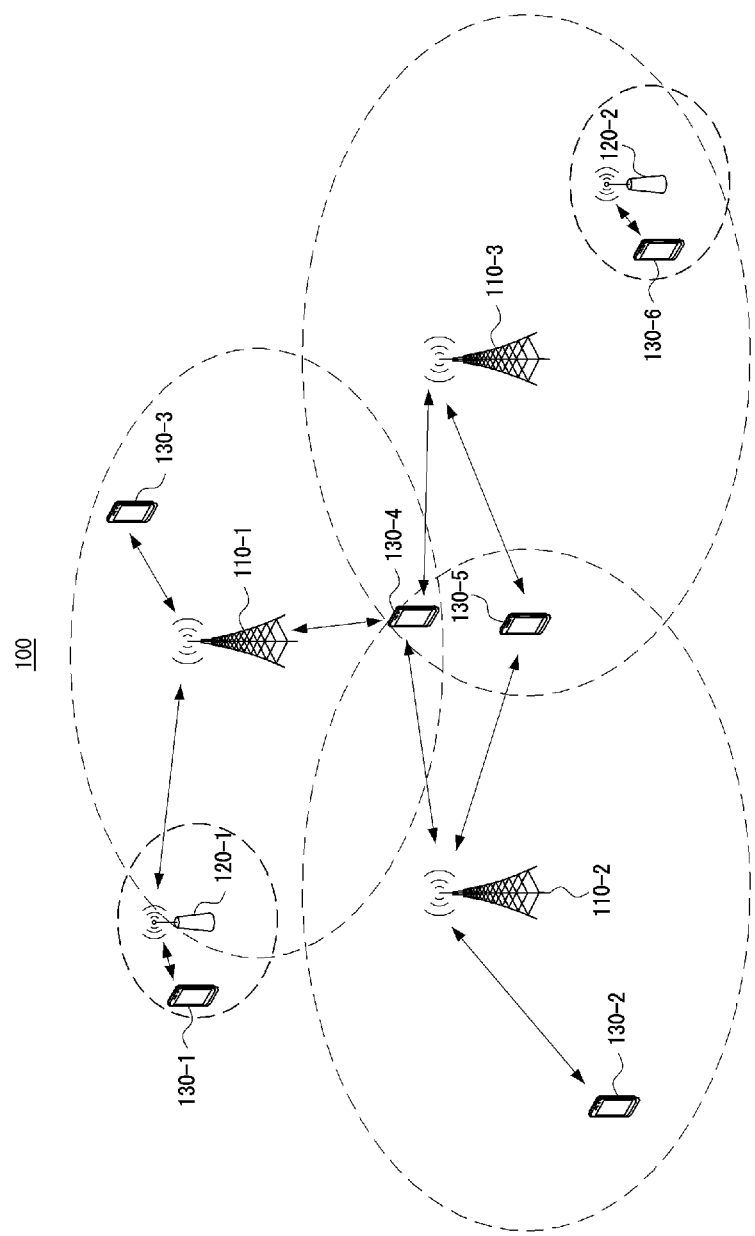
FIG. 1 is a conceptual diagram illustrating an exemplary embodiment of a communication system.

While the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and redundant descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above as well as the frequency band of 6 GHz or below.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
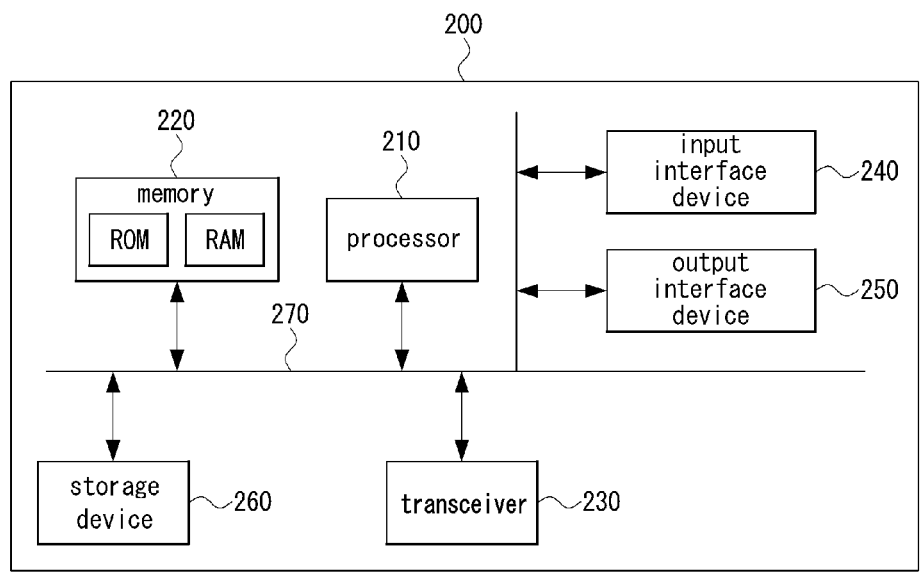
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for configuring and managing radio interfaces in a communication system will be described. Even when a method (e.g., transmission or reception of a signal) performed at a first communication node among communication nodes is described, the corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g., remote radio transmission/reception function, baseband processing function, and the like) of a communication protocol. Alternatively, the remote radio transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like.

The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

Figure 3A:
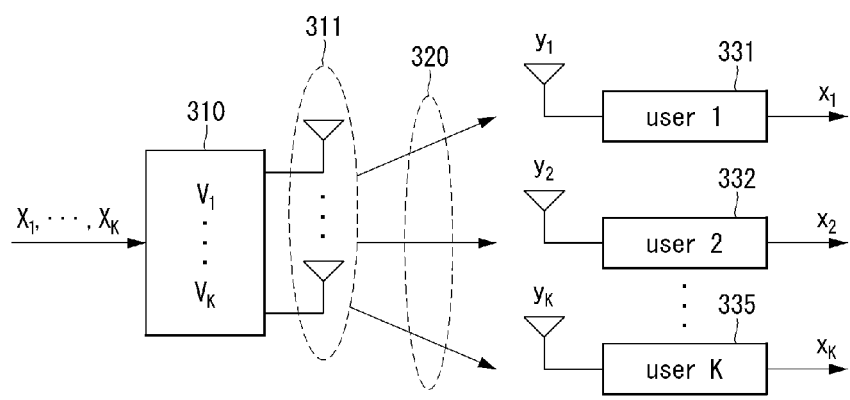
FIG. 3A is a conceptual diagram illustrating a case of beamforming for a plurality of users by a single base station having a plurality of antennas.

FIG. 3A is a conceptual diagram illustrating a case of beamforming for a plurality of users by a single base station having a plurality of antennas.

Referring to FIG. 3A, a base station (BS) 310 having a plurality of antennas 311, a wireless channel 320, and a plurality of users 331, 332, and 335 are illustrated. Each of the users 331, 332, and 335 illustrated in FIG. 3A may refer to user terminals (e.g., user equipments (UEs)). In the following description, for convenience of description, the terminal will be referred to as 'user'. In addition, the BS 310 and/or the users 331, 332, and 335 illustrated in FIG. 3A may have the configuration previously described with reference to FIG. 2.

The BS 310, which receives data $(x_1, \ldots, x_K)$ to be transmitted to the users, may perform beamforming using the plurality of antennas 331, and transmit beams to the users 331, 332, and 333. Each of $V_1, \ldots,$ and $V_K$ illustrated inside the BS 310 in FIG. 3A may be a beamforming vector to form a beam transmitted to a corresponding user. For example, $V_1$ may be a beamforming vector of a beam carrying transmission data $x_1$ transmitted to the user 1 331, and $V_K$ may be a beamforming vector of a beam carrying transmission data $x_K$ transmitted to the user K 335.

The user 1 331 may receive reception data $y_1$ from the BS 310 through the beam. As well known, the reception data $y_1$ received by the user 1 331 may pass through the beamforming vector and a wireless channel. Accordingly, the reception data $y_1$ may be received in form of a signal obtained by multiplying the transmission data $x_1$ with the beamforming vector and a function of the wireless channel 320, and adding a noise thereto. Not only the user 1 331, but also the user 2 332 and the user K 335 may also receive reception data $y_2$ and reception data $y_K$ in the same manner, respectively. In the example of FIG. 3A, it may be assumed that the number of antennas is M, and the wireless channel 320 may be expressed as H.

FIG. 3A described above may correspond to a beamforming scheme in which the single BS 310 having a plurality of antennas performs beamforming for multiple users.

Figure 3B:
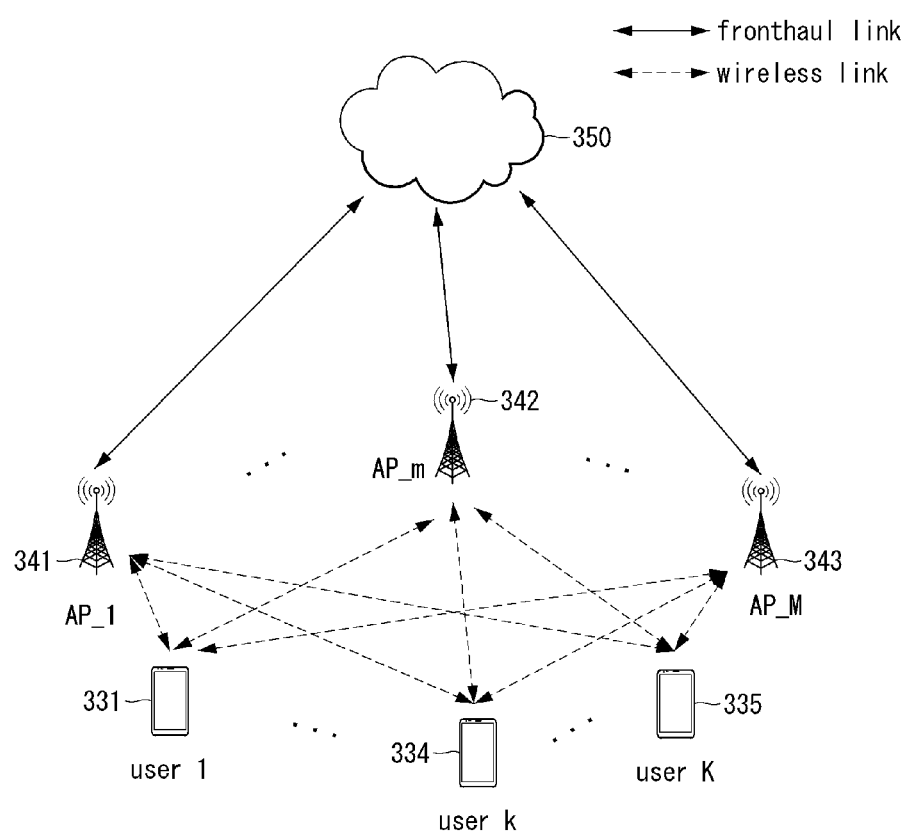
FIG. 3B is a conceptual diagram for describing a case of beamforming for a plurality of users through cooperation of distributed APs.

FIG. 3B is a conceptual diagram for describing a case of beamforming for a plurality of users through cooperation of distributed APs.

Referring to FIG. 3B, distributed access points (APs) 341, 342, and 343 in a distributed MIMO system may be nodes that communicate with users 331, 334, and 335 through wireless links. In FIG. 3B, the users 331, 334, and 335 may be user terminals (e.g., UEs) in the same manner as in FIG. 3A described above, and will be referred to as 'users' for convenience of description. Some of the users 331, 334, and 335 illustrated in FIG. 3B will use the same reference numerals as in FIG. 3A. Each of the APs 341, 342, and 343 may be connected to a central processor (or, control processor (CP)) 350 through a fronthaul link.

As illustrated in FIG. 3B, the user 1 331 may receive data from the plurality of APs 341, 342, and 343. The user k 334 and user K 335 may also receive data from the plurality of APs 341, 342, and 343. In other words, the plurality of APs 341, 342, and 343 may cooperate to transmit data to one user. It should be noted that FIG. 3B is a diagram illustrating a case where two or more APs perform cooperative transmission to one user. In other words, FIG. 3B may be a conceptual diagram illustrating that distributed APs in a distributed MIMO system perform beamforming for multiple users through cooperation.

In FIGS. 3A and 3B, a connection relationship between the BS or the APs and the users and a data transmission therebetween have been described from downlink perspective. In the following description, data transmission will be described from downlink perspective. However, this has been described from the downlink perspective merely for convenience of description, and it may be equally applied to uplink. In other words, the beamforming may be applied not only to downlink but also to uplink, and a deep neural network model according to the present disclosure described below may be applied.

As shown in FIGS. 3A and 3B, transmission antenna units may be arranged together in a single BS (FIG. 3A) or mounted on APs distributed within a coverage (FIG. 3B). In FIG. 3A, it is assumed that the single BS 310 has M antennas. In FIG. 3B, it is assumed that the number of APs 341, 342, and 343 is M. In FIGS. 3A and 3B, the number of users is assumed to be K. Therefore, a set of antennas may be defined as $\tilde{\mathcal{M}} \triangleq \{1, \ldots, |\tilde{\mathcal{M}}|\}$, and a set of users may be defined as $\tilde{\mathcal{K}} \triangleq \{1, \ldots, |\tilde{\mathcal{K}}|\}$.

According to predefined antenna and user selection strategies, the BS 310 or distributed APs 341, 342, 343 may select a set of active antennas that deliver wireless signals to serve a set of scheduled users. The scheduled users may be defined as $\mathcal{K} \subseteq \tilde{\mathcal{K}}$, and the set of active antennas may be defined as $\mathcal{M} \subseteq \tilde{\mathcal{M}}$.

In this case, the size of the antenna set may be variable depending on the number of used antennas of the base station, the number of distributed APs, or the number of antennas for each AP. In addition, considering energy efficiency and frequency efficiency, the number of antennas, the number of distributed APs, or the number of antennas for each AP may optionally vary.

In addition, a distribution of users located within a given coverage area may vary in time and space, and the number of users simultaneously served through beamforming may need to be variable considering system efficiency and user-required Quality of Service (QoS). Therefore, network configurations defined by the set $\mathcal{M}$ of active antennas and the set $\mathcal{K}$ of users should be regarded as random variables that vary at each transmission. In this reason, beamforming calculations in the multi-antenna system may need to adapt to the stochastic sets $\mathcal{M}$ and $\mathcal{K}$.

In the present disclosure, for convenience of description, it is assumed that the number of antennas of each user (e.g., UE) in the wireless network shown in FIGS. 3A and 3B is one (i.e., single antenna). However, in another exemplary embodiment, the number of antennas of UEs may be different. In addition, the number of antennas of each distributed AP devices is assumed to be one (i.e., single antenna). However, in another exemplary embodiment, the number of antennas of distributed AP devices may be plural and different.

In the multi-antenna beamforming-optimized wireless system given as shown in FIGS. 3A and 3B, a complex channel gain from an antenna (m∈ $\mathcal{M}$) to a user (k∈ $\mathcal{K}$) is denoted as $h_{k,m}$, and a beamforming weight therefor is denoted as $w_{m,k}$. Then, a reception signal $y_k(y_k \in \mathbb{C})$ at the user k may be expressed as Equation 1 below.

$$y_k = \sum_{m \in \mathcal{M}} h_{k,m} w_{m,k} x_k + \sum_{i \in \mathcal{K} \setminus \{k\}} \left( \sum_{m \in \mathcal{M}} h_{k,m} w_{m,i} x_i \right) + z_k \quad \text{[Equation 1]}$$

Here, $x_k \sim \mathcal{CN}(0,1)$ indicates a data symbol for the user k. $z_k \sim \mathcal{CN}(0,\sigma^2)$ indicates an additive Gaussian noise at the user k, which has a variance $\sigma^2$.

The set of channel coefficients may be expressed as $H \in \mathbb{C}^{K \times M} \triangleq \{h_{k,m}: \forall k \in \mathcal{K}, \forall m \in \mathcal{M}\}$, and the set of beam weights may be expressed as $W \in \mathbb{C}^{M \times K} \triangleq \{w_{m,k}: \forall m \in \mathcal{M}, \forall k \in \mathcal{K}\}$. Here, $M \triangleq |\mathcal{M}|$ refers to the number of active antennas, and $K \triangleq |\mathcal{K}|$ refers to the number of users. In addition, a transmission rate achievable at the user k, denoted as $R_k(H,W)$, may be expressed as $R_k(H,W) = \log_2(1+\text{SINR}_k)$, and a signal-to-interference noise ratio $\text{SINR}_k$ at the user k may expressed by Equation 2 below.

$$\text{SINR}_k = \frac{\left| \sum_{m \in \mathcal{M}} h_{k,m} w_{m,k} \right|^2}{\sum_{i \in \mathcal{K} \setminus \{k\}} \left| \sum_{m \in \mathcal{M}} h_{k,m} w_{m,i} \right|^2 + \sigma^2} \quad \text{[Equation 2]}$$

The network performance may be measured by a utility function $U(\cdot)$ defined for a set of achievable transmission rates $\{R_k(H,W): \forall k \in \mathcal{K}\}$ Popular choices for the utility function $U(\cdot)$ may be a sum rate (SR) and a minimum rate (MR), which may be denoted as $U_{SR}(\cdot)$ and $U_{MR}(\cdot)$, respectively, and may be expressed as Equation 3 below.

$$U_{SR}(\cdot) = \sum_{k \in \mathcal{K}} R_k(H, W) \text{ and} \quad \text{[Equation 3]}$$
$$U_{MR}(\cdot) = \min_{k \in \mathcal{K}} R_k(H, W)$$

The purpose of the present disclosure is to provide a deep learning structure and scheme for scalable and universal beamforming optimization in the multi-antenna system as described above. To this end, an input channel may be considered as a channel matrix H, and a beamforming operator for mapping a correct beam forming matrix W according thereto may be optimized as $W = \mathcal{W}(H)$. In optimizing the beamforming operator, a deep learning structure and scheme, and a device therefor that can be directly adapted to arbitrary network configurations, such as the number of antennas ($\mathcal{M} \subseteq \tilde{\mathcal{M}}$) and the number of users (($\mathcal{K} \subseteq \tilde{\mathcal{K}}$), will be described.

Based on what has been described above, the network utility maximization problem considered in the present disclosure may be formulated as Equation 4 below.

$$\max_{\mathcal{W}(\cdot)} \mathbb{E}_{H, \mathcal{M}, \mathcal{K}} \left[ U \cdot \left( \{R_k(H, \mathcal{W}(H)): \forall k \in \mathcal{K}\} \right) \right] \quad \text{[Equation 4]}$$
$$\text{s.t.} \sum_{k \in \mathcal{K}} \sum_{m \in \mathcal{M}} |\mathcal{W}_{m,k}(H)|^2 = P, \forall \mathcal{K} \subseteq \tilde{\mathcal{K}}, \forall \mathcal{M} \subseteq \tilde{\mathcal{M}}$$

Hereinafter, for convenience of description, the upper line of Equation 4 will be described as Equation 4a, and the lower line thereof will be described as Equation 4b.

In Equation 4, $\mathcal{W}_{m,k}(H)$ may be the (m,k)-th element of $\mathcal{W}(H)$. P may refer to a power constraint across all BSs or distributed AP antennas. Equation 4a is an objective function and represents the SR utility performance or MR utility performance averaged over the channel distribution as well as the number of antennas ($\mathcal{M} \subseteq \widetilde{\mathcal{M}}$) and the number of users ($\mathcal{K} \subseteq \widetilde{\mathcal{K}}$), which correspond to subsets.

The classic beamforming optimization algorithms are solved for a fixed channel function H, a fixed number $\mathcal{M}$ of antennas, and a fixed number $\mathcal{K}$ of users. They require special characteristics for a utility function, such as 'convexity'. Nonconvex problems may be addressed with convex approximation techniques, but most of them result in suboptimal performance. Moreover, iterative calculation procedures result in very high time complexity in large-scale systems, which hinders scalability to various network configurations.

The prior beamforming optimization techniques based on deep learning introduce a deep neural network to implement an unknown beamforming operator $\mathcal{W}(\bullet)$ described in the classical scheme. Deep neural networks according to schemes known to date may be trained directly to maximize an arbitrary utility function, regardless of their convex properties. In addition, deep neural networks according to schemes known to date may provide superior performance with reduced complexity than classical optimization algorithms through direct training of the arbitrary utility function. However, because deep neural network training relies on fully-connected layers with a fixed number of input and output variables, it may only be applied to certain combinations of the number of antennas and the number of users.

Therefore, in deep learning-based advanced beamforming optimization techniques, multiple deep neural networks respectively optimized for all possible combinations of the number of antennas and the number of users should be prepared. This may have an infinite number of combinations of the number of antennas and the number of users. Accordingly, it requires training steps that require calculations that are prohibitively complex using current calculation schemes, and it also requires excessive memory requirements to store learned parameters.

The present disclosure proposes a method for solving the optimization problem given as Equation 4. In other words, the present disclosure proposes a method to reduce the dimensionality of the beamforming solution W=$\mathcal{W}$(H) described in Equation 4 without causing optimization loss. In addition, the present disclosure proposes a method of reducing training parameters of the deep neural network based on results according to the method of the present disclosure. In addition, an effective learning scheme may be used for beamforming optimization that utilizes expert knowledges in the wireless communication domain.

$\mathcal{W}_k(\text{H})$ and $h_k \in \mathbb{C}^M$ may be defined as the k-th columns of $\mathcal{W}(\text{H})$ and $\text{H}^H$, respectively. In other words, $\mathcal{W}_k(\text{H})$ for a user k and a channel function $h_k \in \mathbb{C}^M$ for the user k may be expressed as the k-th columns of $\mathcal{W}(\text{H})$ and $\text{H}^H$, respectively. Assuming that there is duality between uplink and downlink systems, the optimal beamforming for the user k may be determined as shown in Equation 5 below.

$$\mathcal{W}_k(H) = \sqrt{p_k} \frac{\left(\sigma^2 I_M + \sum_{i \in \mathcal{K}} q_i h_i h_i^H\right)^{-1} h_k}{\left\|\left(\sigma^2 I_M + \sum_{i \in \mathcal{K}} q_i h_i h_i^H\right)^{-1} h_k\right\|} \triangleq \mathcal{V}_k(H, s) \quad \text{[Equation 5]}$$

In Equation 14, a primal downlink power $p_k$ and a virtual uplink power $q_k$ of the user k are each greater than 0 ($p_k \geq 0$, $q_k \geq 0$), and they have a relationship of $\sum_{k \in \mathcal{K}} p_k = \sum_{k \in \mathcal{K}} q_k = P$. In other words, the power constraint in Equation 4b is satisfied. In addition, in Equation 5, $s \triangleq \{(p_k, q_k) : \forall k \in \mathcal{K}\} \in \mathbb{R}^{2K}$ represents beam-characteristics.

It is known that Equation 5 obtains all possible trade-off points of a data rate $R_k(\bullet)$, $\forall k$ including a Pareto-optimal bound. Therefore, Equation 5 may become the optimum of Equation 4 for an arbitrary utility function U($\bullet$).

A calculation process that derives the beam-characteristics as shown in Equation 16 from the channel matrix H may be denoted as s=$\mathcal{D}$(H). Here, the user k's beamforming operator may be expressed as $\mathcal{W}_k(\text{H})=\mathcal{V}_k(\text{H},\mathcal{D}(\text{H}))$. Substituting the beam forming operator back into Equation 4, it may become an equivalent problem to finding a beam-characteristic mapping $\mathcal{D}(\bullet)$. Without loss of optimization, this reduces a dimensionality of a solution space from 2NK to 2K, thereby enabling lightweight neural network architectures.

Figure 4:
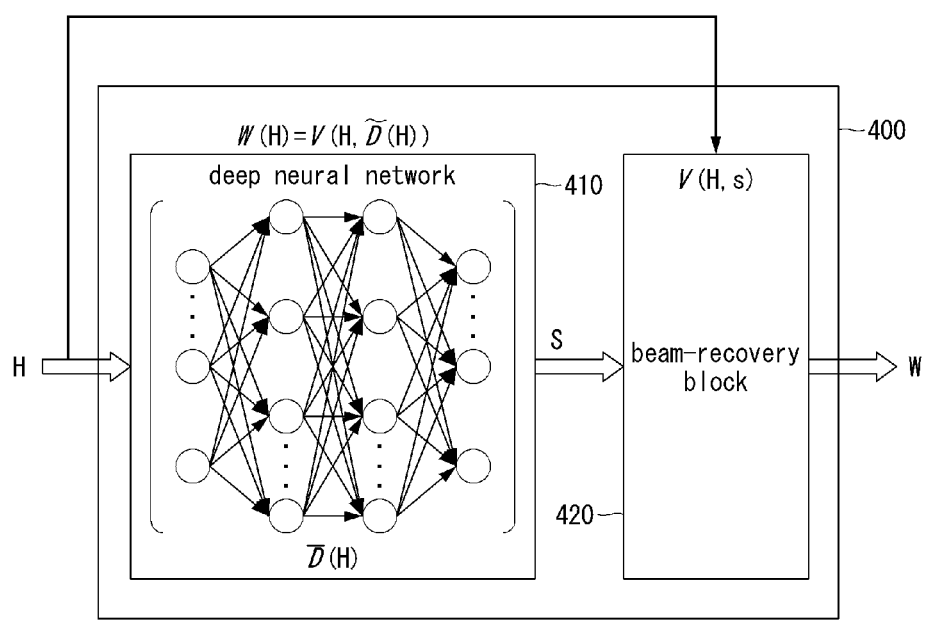
FIG. 4 is a block diagram illustrating an exemplary embodiment of a deep learning beamforming optimizer that captures beam characteristics.

FIG. 4 is a block diagram illustrating an exemplary embodiment of a deep learning beamforming optimizer that captures beam characteristics.

A deep learning beamforming optimizer 400 illustrated in FIG. 4 may include a deep neural network 410 and a beam-recovery block 420. The beamforming optimizer 400 may receive a channel matrix H as input and may output an optimal beamforming matrix $\mathcal{W}$. More specifically, the channel matrix H may be input to the deep neural network 410 and the beam-recovery block 420 that capture or calculate beam characteristics, respectively. The deep neural network 410 that captures the beam characteristics may be constructed and optimized to fit the dimensionality of the input channel matrix H$\in \mathbb{C}^{K \times M}$ and the output beam characteristics s$\in \mathbb{R}^{2K}$. The beam-recovery block 420 may output the optimal beamforming matrix $\mathcal{W}$ by receiving the channel matrix and beam characteristics as inputs, respectively. The present disclosure proposes a scalable structure that allows the deep neural network 410 capturing beam characteristics in the deep learning beamforming optimizer 400 illustrated in FIG. 4 to operate regardless of the input/output dimensionality.

In general, a communication network may be modeled as a graph in which entities constituting the network are expressed as vertices and relational characteristics between the entities are expressed as edges. In such the modeling, edges may refer to relational characteristics between vertices corresponding to network-side entities and vertices corresponding to user-side entities.

Considering the above-described edge characteristics, the entities of the multi-user beamforming communication network as shown in FIGS. 3A and 3B may be functionally classified into two categories: antenna (or distributed AP) entities and user entities. The edges may be defined as relational characteristics between the user entities and the network entities for which antenna (or distributed AP) entities are given as vertices. In other words, an edge may be a relational characteristic between a specific antenna (or distributed AP) and a specific user, and may be defined as a channel with a wireless link propagation gain.

Figure 5:
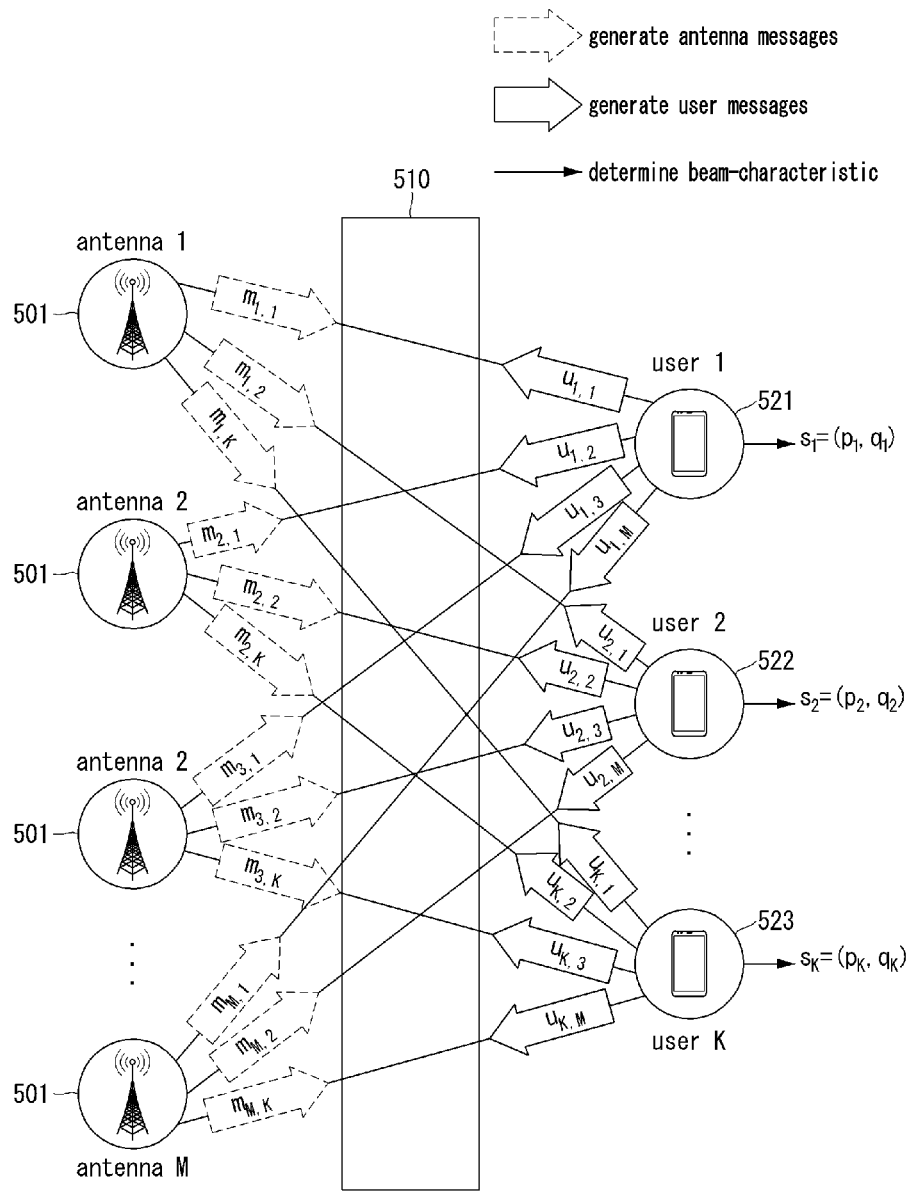
FIG. 5 is a conceptual diagram of bipartite graph modeling in a multi-user beamforming system.

FIG. 5 is a conceptual diagram of bipartite graph modeling in a multi-user beamforming system.

Referring to FIG. 5, an antenna 1 501, antenna 2 502, antenna 3 503, and antenna M 504 are illustrated. The antennas 501, 502, 503, and 504 illustrated in FIG. 5 may be the plurality of antennas 311 provided in the BS 310 illustrated in FIG. 3A, or may be the plurality of APs 341, 342, and 343 illustrated in FIG. 3B. In addition, FIG. 5 illustrates a user 1 521, user 2 522, and user K 523. The users 521, 522, and 523 illustrated in FIG. 5 may also be the users 331, 332, and 335 illustrated in FIG. 3A, and may also be the users 331, 334, and 335 illustrated in FIG. 3B.

As illustrated in FIG. 5, a bipartite graph may include the antennas 501 to 504 on the network side and the users 521 to 523 on the user side, as described above. Therefore, in the bipartite graph, each of the antennas 501 to 504 on the network side may be a vertex on the network side, and each of the users 521 to 523 on the user side may be a vertex on the user side.

In addition, according to the example of FIG. 5, each of the users 521 to 523 may be connected to each of the antennas 501 to 504. Such the connection may be an edge, which is a relational characteristic between vertices, as described above. In other words, a channel 510 illustrated in FIG. 5 may be expressed as an edge corresponding to a wireless link. An antenna m, a vertex on the network side, may be an element of an antenna set. A user k, which is a vertex on the user side, may be an element of a user set. Therefore, a weight of the edge connecting the antenna m, which is a vertex on the network side, and the user k, which is a vertex on the user side, may be a propagation gain or complex channel gain of a wireless link, and may be mapped to $h_{k,m}$. In other words, $h_{k,m}$ may be an edge weight between the antenna m and the user k, a wireless link propagation gain between the antenna m and the user k, or a complex channel gain between the antenna m and the user k.

The edge weight $h_{k,m}$ between the antenna m and the user k may be divided into an uplink propagation gain and a downlink propagation gain because the channel between the antenna m and the user k is a wireless channel. When there is duality between uplink and downlink systems, the same frequency is used between uplink and downlink. Therefore, when using a time division duplexing protocol that uses the same frequency between uplink and downlink, it may be assumed that propagation gains in both directions are the same due to channel reciprocity because the same frequency is used between uplink and downlink. However, such the channel reciprocity may not be satisfied in a special case, such as when a user moves at high speed. Therefore, in the present disclosure, the edge weight $h_{k,m}$ may be the same for uplink and downlink between the antenna m and the user k. In this case, the edge may be undirected. As described above, the edge weight may be understood by replacing it with the propagation gain or complex channel gain of the wireless link.

Meanwhile, the network size may be determined depending on the number of antennas and the number of users. Here, the number of antennas may refer to the number of active antennas, and the number of users may refer to the number of scheduled users. In addition, sets of channel coefficients may be determined according to the network size, as described above. In other words, the channel coefficients $H \in \mathbb{C}^{|\mathcal{K}| \times |\mathcal{M}|}$ may be determined based on the number of active antennas and the number of scheduled users. This may mean that the set of channel coefficients is determined depending on the network size.

Once the set of channel coefficients is determined, a bipartite graph $\mathcal{G} = (\mathcal{M}, \mathcal{K}, H)$ that fits the dimensionality of the set of channel coefficients may be formed.

The example of FIG. 5 may correspond to a bipartite graph based on FIGS. 3A and/or 3B described above, and may correspond to a bipartite graph based on the number of antennas, the number of users, and the corresponding channel coefficients. In FIG. 3A, it is assumed that each user has a single antenna, and in FIG. 3b, it is assumed that APs each having a single antenna are distributed. In other words, in case of FIG. 3A, users having multiple antennas may be regarded as being excluded, and in case of FIG. 3B, APs having multiple antennas may be regarded as being excluded. However, in case of a user with multiple antennas, each of the user's multiple antennas may be modeled as one vertex. In addition, in case of distributed APs with multiple antennas, each individual antenna of the AP may be modeled as an antenna vertex as illustrated in FIG. 5.

Therefore, FIG. 5 assumes the situation of FIG. 3A or FIG. 3B for convenience of description, and may be extended to a case where the distributed AP has multiple antennas and the user has multiple antennas, as described in the example above.

Referring again to FIG. 5, the antenna 1 501 may be connected to the user 1 521 through an edge. In other words, the antenna 1 501 may be connected to the user 1 521 through a channel $h_{1,1}$ having a wireless link propagation gain. In addition, the antenna 1 501 may be connected to the user 2 522 through a channel $h_{2,1}$ having a wireless link propagation gain, and the antenna 1 501 may be connected to the user K 523 through a channel $h_{k,1}$ having a wireless link propagation gain.

Similarly to the connections of the antenna 1 501, the antenna 2 502 may also be connected to each of the users 521 to 523 through the corresponding edge. In other words, the antenna 2 502 may be connected to the user 1 521 through a channel $h_{1,2}$ having a wireless link propagation gain, the antenna 2 502 may be connected to the user 2 522 through a channels $h_{2,2}$ having a wireless link propagation gain, and the antenna 2 502 may be connected to the user K 523 through a channel $h_{K,2}$ having a wireless link propagation gain.

In the same manner, the antenna 3 503 may be connected to the user 1 521 through a channel $h_{1,3}$ having a wireless link propagation gain, the antenna 3 503 may be connected to the user 2 522 through a channel $h_{2,3}$ having a wireless link propagation gain, and the antenna 3 502 may be connected to the user K 523 through a channel $h_{K,3}$ having a wireless link propagation gain.

Further, the antenna M 504 may be connected to the user 1 521 through a channel $h_{1,M}$ having a wireless link propagation gain, the antenna M 504 may be connected to the user 2 522 through a channel $h_{2,m}$ having a wireless link propagation gain, and the antenna M 504 may be connected to the user K 523 through a channel $h_{K,M}$ having a wireless link propagation gain.

Hereinafter, operations of the antennas 501-504, which are entities on the network side, will be described. In the description of FIG. 5, a method of implementing a beam characteristic calculation deep neural network in an scalable structure that can operate regardless of input and output dimensions will be described through methods and procedures to be described later.

In summary, an antenna (or distributed AP) vertex may generate an antenna message $a_{m,k}$, $\forall m \in \mathcal{M}$, $\forall k \in \mathcal{K}$ through an antenna operation function $\mathcal{A}(\bullet)$, which will be described later. In the present disclosure described below, the antenna message may be information related to beam characteristics of a transmission beam transmitted from the antenna m to the specific user k. An antenna combined message $m_{m,k}$, $\forall m \in \mathcal{M}$, $\forall k \in \mathcal{K}$, which is combined with antenna messages $a_{m,i}$, $\forall i \neq k$ for other users, may be shared with all user vertices connected to the edges. In addition, the user vertex may generate a user message $u_{k,m}$, $\forall k \in \mathcal{K}$, $\forall m \in \mathcal{M}$ through a user message operation function $\mathcal{U}(\bullet)$, which will be described later. In the present disclosure, the user message may be information related to beam characteristics of a beam that the user k receives from the specific antenna m. Information related to transmission beam characteristics and information related to reception beam characteristics may have various forms. For example, it may include at least one of various information such as a transmission power, reception power intensity, and/or reception signal quality, transmission angle (or direction), reception angle (or direction), and/or the like. The user messages may also be shared with all antenna vertices connected to the edges. The beam characteristics $s_k=(p_k,q_k)$, $\forall k \in \mathcal{K}$ may be output through a beam characteristic operation function $\mathcal{D}(\bullet)$ that determines the beam characteristics.

As illustrated in FIG. 5, each of the antennas 501, 502, 503, and 504 may be connected to the users 521, 522, and 523 through edges, and may transmit combined messages to the users 521, 522, and 523, respectively. For example, the antenna 1 501 may transmit combined messages $m_{1,1}$, $m_{1,2}$, and $m_{1,k}$ to the corresponding users 521, 522, and 523, respectively. The other antennas 502, 503, and 504 may also transmit combined messages corresponding to the users 521, 522, and 523, respectively.

In addition, each of the users 521, 522, and 523 may be connected to the antennas 501, 502, 503, and 504 through edges, and may transmit user messages to the antennas 501, 502, 503, and 504, respectively. For example, the user 1 521 may transmit user messages $u_{1,1}$, $u_{1,2}$, $u_{1,3}$, and $u_{1,M}$ to the corresponding antennas 501, 502, 503, and 504, respectively. The other users 522 and 523 may also transmit user messages to the corresponding antennas 501, 502, 503, and 504, respectively.

In other words, the vertices, such as the antennas 501, 502, 503, and 504, and the users 521, 522, and 523, may exchange calculated statistical information with each other through bipartite message passing (BMP). In addition, as the BMP process is iterated, a beam-characteristic determination operation of the user vertex may be improved. The number of iterations of the BMP process may be determined by considering specific conditions, such as a computation speed and/or computation load, amount of memory required, etc.

The process of deriving optimal results through the iterative BMP processes is referred to as 'BMP inference'. In the present disclosure, a beam-characteristic $s_k^{[T]}$, $\forall k \in \mathcal{K}$, which is a BMP inference result derived through T iterations, may be provided as a final converging beam characteristic $s_k=(p_k,q_k)$. The calculation functions of the vertex, which is required in the BMP inference, may ultimately be implemented through parameterized deep neural networks.

Figure 6:
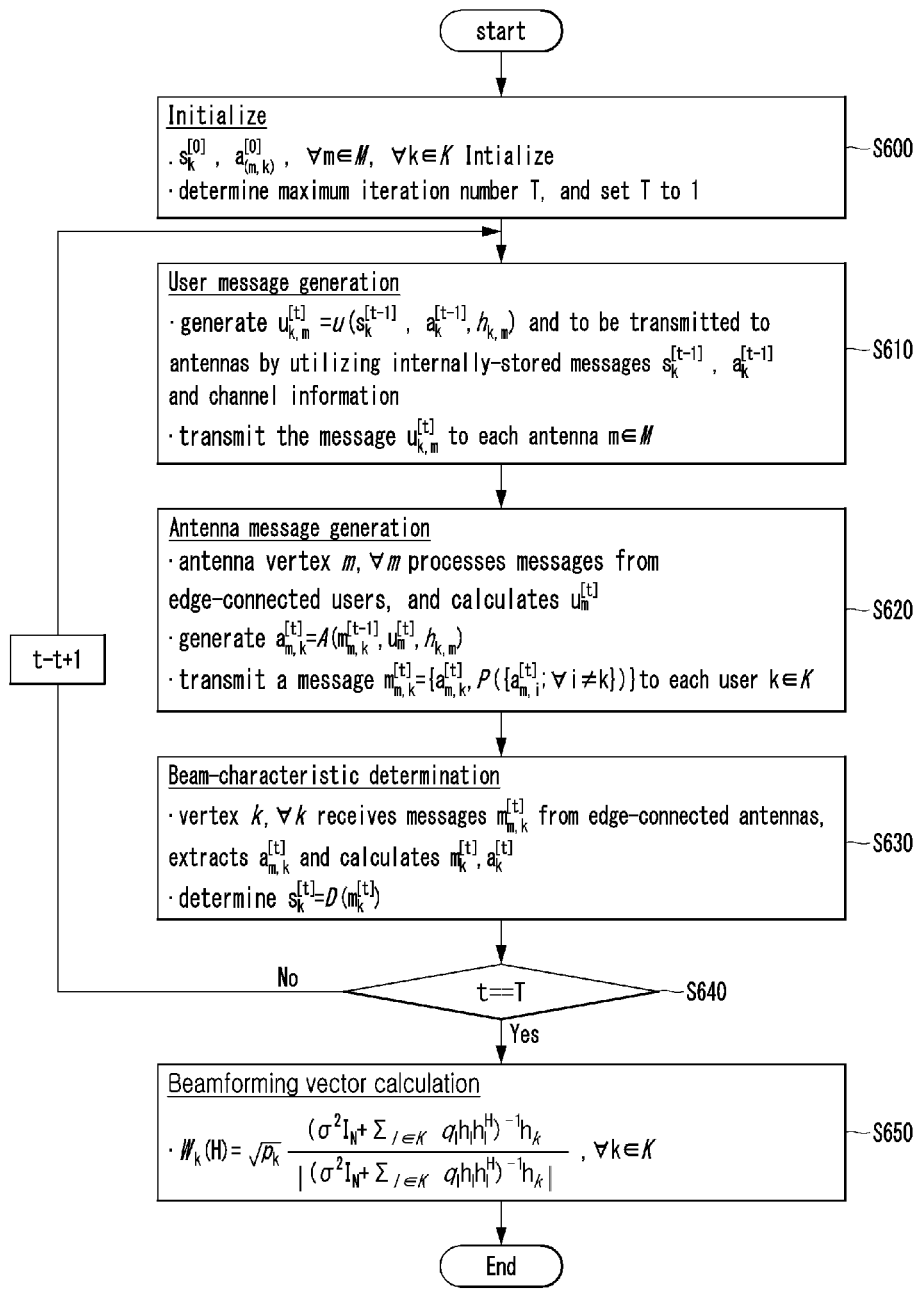
FIG. 6 is a flowchart for BMP inference according to an exemplary embodiment of the present disclosure.

FIG. 6 is a flowchart for BMP inference according to an exemplary embodiment of the present disclosure.

In the description of the BMP inference operation of FIG. 6 described below, the antenna operation function $\mathcal{A}(\bullet)$, the user message operation function $\mathcal{U}(\bullet)$, and the beam characteristic operation function $\mathcal{D}(\bullet)$, which are unstructured operation functions, will be described as they are.

Before describing each step illustrated in FIG. 6, operation methods according to BMP inference according to the present disclosure will be described. The operations of the vertex, which are performed in the t-th iteration of BMP inference, may be defined as Equation 6 below.

$$u_{k,m}^{[t]} = \mathcal{U}(s_k^{[t-1]}, a_k^{[t-1]}, h_{k,m})$$

$$a_{m,k}^{[t]} = \mathcal{A}(m_{m,k}^{[t-1]}, u_m^{[t]}, h_{k,m})$$

$$s_k^{[t]} = \mathcal{D}(m_k^{[t]}) \quad \text{[Equation 6]}$$

The operation in the first line of Equation 6 may be a user message generation operation, and in the following description, it will be referred to as 'Equation 6a' or 'user message generation operation' for convenience of description. Accordingly, an operation result of Equation 6a, $u_{k,m}^{[t]}$, may be a 'user message'.

The operation in the second line of Equation 6 may be an antenna message generation operation, and in the following description, it will be referred to as 'Equation 6b' or 'antenna message generation operation' for convenience of description. Accordingly, an operation result of Equation 6b, $a_{m,k}^{[t]}$, may be an 'antenna message'.

The operation in the third line of Equation 6 may be a beam characteristic determination operation, and in the following description, it will be referred to as 'Equation 6c' or 'beam characteristic determination operation' for convenience of description. Accordingly, an operation result of Equation 6c, $s_k^{[t]}$, may be a 'beam characteristic message'.

In addition, in Equation 6, the vectors $a_k^{[t]}$, $u_m^{[t]}$, $m_k^{[t]}$, and $m_k^{[t]}$ may be defined as in Equation 7.

$$a_k^{[t]} \triangleq \mathcal{P}(\{a_{j,k}^{[t]}; \forall j \in \mathcal{M}\})$$

$$u_m^{[t]} \triangleq \mathcal{P}(\{u_{i,m}^{[t]}; \forall i \in \mathcal{K}\})$$

$$m_{m,k}^{[t]} \triangleq \{a_{m,k}^{[t]}, \mathcal{P}(\{a_{m,i}^{[t]}; \forall i \neq k\})\}$$

$$m_k^{[t]} \triangleq \mathcal{P}(\{m_{j,k}^{[t]}; \forall j \in \mathcal{M}\}) \quad \text{[Equation 7]}$$

The first line in Equation 7 defines an antenna message vector, and in the following description, it will be referred to as 'Equation 7a' or 'antenna message vector' for convenience of description.

The second line in Equation 7 defines a user message vector, and in the following description, it will be referred to as 'Equation 7b' or 'user message vector' for convenience of description.

The third line in Equation 7 defines a combined message vector, and in the following description, it will be referred to as 'Equation 7c' or 'antenna combined message vector' for convenience of description.

The fourth line in Equation 7 defines a vector obtained by performing a pooling operation on the combined message vector, and in the following description, it will be referred to as 'Equation 7d' or 'pooling-operated vector of the antenna combined message vector' for convenience of description.

Describing the definition of the vector factors included in Equation 7, an operation of preprocessing messages received through bipartite graph edges using a pooling operator $\mathcal{P}(\bullet)$ may be included. The operation methods of the pooling operator may include max pooling, average pooling, and sum pooling.

The pooling operator may perform an important role in enabling calculations in which each of the $\mathcal{A}(\bullet)$, $\mathcal{A}(\bullet)$, and $\mathcal{D}(\bullet)$ operations of Equation 6 does not depend on the network size in BMP inference according to the present disclosure. In order to ensure that each of these operations does not depend on the network size, the dimensionality of the output may be limited to be the same as the dimensionality of the input. Therefore, there may be various choices for the pooling operator, but in the present disclosure, for a d-dimensional variable $\tau_z^{(d)}$, $\forall z \in \mathcal{Z}$, a sum pooling operator defined as Equation 8 below may be used.

$$\mathcal{P}(\{\tau_z^{(d)}: \forall z \in \mathcal{Z}\}) = \sum_{z \in \mathcal{Z}} \tau_z^{(d)} \quad \text{[Equation 8]}$$

In addition, in BMP inference, both the dimensionality (vector length) of antenna messages and user messages exchanged through bipartite graph edges may be set to $\Omega$, regardless of the network size $|\mathcal{M}|$ and $|\mathcal{K}|$. Accordingly, the dimensionality of the antenna message vector and the user message vector, defined by Equation 7a and Equation 7b using the pooling operator, may also both be $\Omega$.

On the other hand, the antenna combined message vector defined by Equation 7c has a $2\Omega$ dimensionality by concatenating the $\Omega$-dimensional antenna message and the $\Omega$-dimensional $\mathcal{P}(\{a_{m,i}^{[t]}; \forall i \neq k\})$. Accordingly, the pooling operation vector of the combined message defined by Equation 7d may be of $2\Omega$ dimension, which is the same as the input dimensionality of the pooling operator.

The input/output dimensionality of the vertex operators $\mathcal{A}(\bullet)$, $\mathcal{A}(\bullet)$, and $\mathcal{D}(\bullet)$ defined by Equations 6a to 6c may be specified with each dimension information of the vectors defined by Equations 7a to 7d. The beam characteristic message, which is beam characteristic information, has two dimensions $(p_k, q_k)$ as already defined. Therefore, the user message generation operation defined in Equation 6a may have 2-dimensional $s_k^{[t-1]}$, $\Omega$-dimensional $a_k^{[t-1]}$ and 2-dimensional $h_{m,k}$ according to a scheme of expressing a complex number as a pair of two real numbers as its input for outputting a $\Omega$-dimensional user message.

Also in the case of the antenna message generation operation in Equation 6b, in order to output a $\Omega$-dimensional antenna message, it may have 2 $\Omega$-dimensional $m_{m,k}^{[t-1]}$, $\Omega$-dimensional $u_m^{[t]}$, and 2-dimensional $h_{m,k}$ as its inputs.

The beam characteristic determination operation of Equation 6c may receive 2 $\Omega$-dimensional $m_k^{[t]}$ as input and output two-dimensional beam characteristics.

[Derivation of BMP Inference]

A process of optimizing beam-characteristics through message exchange, that is, a process of deriving BMP inference will be described.

In general, as in Equation 5, the user's beam characteristic $s_k = (p_k, q_k)$ may be calculated optimally using the channel matrix $H = \{h_{k,m}; \forall k, m\}$ and other users' beam characteristics $s_i$, $\forall i \neq k$. The objective function for optimization given by Equation 4 indicates that an order of user indices has no effect on the calculation. Based on this intuition, the calculation process of optimal beam characteristics may be seen to have the same structure for all users, and this is denoted by the beam characteristic determination operator $\mathcal{D}(\bullet)$ to express the user's beam characteristic as shown in Equation 9 below.

$$s_k = \mathcal{D}(\{s_i, \forall i \neq k\}, \{h_{i,m}; \forall i, m\}) \qquad \text{[Equation 9]}$$

As shown in Equation 9, a structural problem that requires information on beam characteristics $\{s_i, \forall i \neq k\}$ of other users to determine the beam characteristic of the user k should be solved. To solve the problem of requiring beam characteristic information of other users, beam characteristic information may be determined by exchanging user beam characteristic information in the previous step. In addition, it is necessary to iterate this process to update the beam characteristic information. The beam characteristic determination process of Equation 9 may be rewritten as Equation 10 below.

$$s_k^{[t]} = \mathcal{D}(s_k^{[t-1]}, \{s_i^{[t-1]}, \forall i \neq k\}, \{h_{i,m}; \forall i, m\}) \qquad \text{[Equation 10]}$$

Here, if the antenna message is defined as $a_{m,k}^{[t]} = (s_k^{[t-1]}, h_{k,m})$ and substituted into Equation 10, the beam characteristic message may be given as Equation 11 below.

$$s_k^{[t]} = \mathcal{D}(\{a_{m,k}^{[t]}, \forall m\}, \{a_{m,i}^{[t]}; \forall i \neq k, \forall m\}) \qquad \text{[Equation 11]}$$

Considering the recursive expression defined by Equation 11, the antenna message may be expressed as Equation 12 below using the operator $\mathcal{A}(\bullet)$.

$$a_{m,k}^{[t]} = (s_k^{[t-1]}, h_{k,m}) = \mathcal{A}(\{a_{m,k}^{[t-1]}, \forall m\}, \{a_{m,i}^{[t-1]}; \forall i \neq k, \forall m\}, h_{k,m}) \qquad \text{[Equation 12]}$$

In addition, if the user message is newly expressed as $u_{k,m}^{[t]} = \{a_{j,k}^{[t-1]}; \forall j \neq m\}$, Equation 12 may be simplified as shown in Equation 13 below.

$$a_{m,k}^{[t]} = \mathcal{A}(a_{m,k}^{[t-1]}, \{u_{i,m}^{[t]}; \forall i\}, \{a_{m,i}^{[t-1]}; \forall i \neq k\}, h_{k,m})$$

$$= \mathcal{A}(m_{m,k}^{[t-1]}, \{u_{i,m}^{[t]}; \forall i\}, h_{k,m}) \qquad \text{[Equation 13]}$$

In the following description, the operation in the upper line of Equation 13 will be referred to as 'Equation 13a', and the operation in the lower line thereof will be referred to as 'Equation 13b'.

In Equation 13b, to simplify the equation, the antenna combined message vector may be expressed as $m_{i,k}^{[t]} \triangleq (a_{m,k}^{[t]}, \{a_{m,i}^{[t]}; \forall i \neq k\})$ which is a new definition.

To derive an operation independent of the network size, if a pooling operator such as Equation 8 is introduced, Equation 13 may become the same as Equation 6b.

In addition, substituting the definition of the antenna combined message vector used in Equation 13b and Equation 7d into Equation 11 results in a simplified beam characteristic determination equation given by Equation 6c.

Meanwhile, the information vector $u_{k,m}^{[t]} = \{a_{j,k}^{[t-1]}; \forall j \neq m\}$ used in the simplification of Equation 12 may be calculated as in Equation 14 below using the operator $\mathcal{U}(\bullet)$.

$$u_{k,m}^{[t]} = \mathcal{U}(a_{m,k}^{[t-1]}, \{a_{j,k}^{[t-1]}; \forall j\}) = \mathcal{U}(s_k^{[t-1]}, a_k^{[t-1]}, h_{k,m}) \qquad \text{[Equation 14]}$$

In the following description, for convenience of description, the first line of Equation 14 will be referred to as 'Equation 14a', and the second line thereof will be referred to as 'Equation 14b'.

Equation 14b may use $a_{m,k}^{[t]} = (s_k^{[t-1]}, h_{k,m})$, which is a new definition of the antenna message $a_{m,k}^{[t]} = (s_k^{[t-1]}, h_{k,m})$ used to derive Equation 11, and the pooling operation in Equation 7a.

As described above, the pooling operator $\mathcal{P}(\bullet)$, which is defined to be operated regardless of the network size defined by $|\mathcal{M}|$ and $|\mathcal{K}|$, and the operations $\mathcal{A}(\bullet)$, $\mathcal{U}(\bullet)$, and $\mathcal{D}(\bullet)$ performed on individual vertices may be used to perform the BMP inference procedure specified in FIG. 6.

Then, based on the content described above, the BMP inference procedure according to the present disclosure will be described with reference to the flowchart of FIG. 6.

First, initialization may be performed in a step S600. The initialization may be an operation that sets all parameters to initial values. For example, an initial beam characteristic vector $s_k^{[0]}$, initial antenna message vector $a_{m,k}^{[t]}$, initial user message vector $u_{k,m}^{[0]}$, number of antennas, and number of users may be initialized. Since BMP inference is iterated T times in the present disclosure, a count value t for counting the iterations may be set to 1. In other words, T iterations for BMP inference may be started by performing the initialization of step S600.

In this case, each of the initial beam characteristic vector, initial antenna message vector, and initial user message vector may be set to a zero vector (or random vector) having each dimension length, which will be described later.

A user message generation operation in a step S610, antenna message generation operation in a step S620, and beam characteristic determination operation in a step S630 described below may be operations to be iteratively performed T times.

In the following description, for simplicity and clarity of computational operations, description will be based on an interaction between the k-th user vertex and the m-th antenna vertex. In addition, since the below-described process should be repeated T times, the description will be based on t arbitrary iterations. Therefore, it should be noted that the descriptions of the steps S610, S620, and S630 described below are all operations performed in t iterations.

In the step S610 in which the t-th iteration is performed, the user message generation operation defined in Equation 6a may be performed. In other words, to generate a user message $u_{k,m}^{[t]}$, $\forall k \in \mathcal{K}$, $\forall m \in \mathcal{M}$, the k-th ($k, \forall k \in \mathcal{K}$) user vertex may use the user message generation operator $\mathcal{U}(\bullet)$. The k-th user vertex may generate a $\Omega$-dimensional user message by using a beam characteristic $s_k^{[t-1]} \triangleq (p_k, q_k)$ calculated in the previous iteration, that is, the (t−1)-th iteration, the antenna message vector $a_k^{[t-1]} \in \mathbb{R}^\Omega$ given as in Equation 7a, and input data having a dimensional length $\Omega+4$ consisting of scalar channel gain $h_{k,m}$ on as inputs of the user message generation operator. The user message vector defined in Equation 7b may be knowledge information at the user k required by the antenna m. The user message generation procedure in the t-th iteration may be completed by transmitting the user message vector to each antenna $\forall m \in \mathcal{M}$.

The antenna message generation may be performed in the step S620 in which the t-th iteration is performed. In other words, in order to generate the antenna message $a_{m,k}^{[t]}$, $\forall m \in \mathcal{M}$, $\forall k \in \mathcal{K}$, the m-th antenna vertex ($\forall m \in \mathcal{M}$) may use the antenna message generation operator $\mathcal{A}(\bullet)$ defined by Equation 6b. To this end, $3(\Omega+2)$-dimensional input data consisting of information vectors $m_{m,k}^{[t-1]} \in \mathbb{R}^{2\Omega}$ of the previous iteration, $u_i^{[t]} \in \mathbb{R}^\Omega$ obtained by pooling user messages collected from all user vertices $k \in \mathcal{K}$ connected to the antenna m through a pooling operator as shown in Equation 7b, and channel gain $h_{k,m}$ may be used as inputs of the antenna message generation operator $\mathcal{A}(\bullet)$. The resulting $\Omega$-dimensional antenna message may be information on the user k inferred from the antenna m. A message to be finally delivered to each user $\forall k \in \mathcal{K}$ may be an antenna combined message vector defined by Equation 7c, which is obtained by concatenating the antenna message $a_{m,k}^{[t]}$ dedicated for the user k generated through the antenna message generation operation and a pooling result of antenna messages $a_{m,i}^{[t]}$; $\forall i \neq k$ generated for other users. The antenna message generation procedure in the t-th iteration may be completed by transmitting the antenna combined message vector $m_{m,k}^{[t]}$ constructed in the above-described manner to each user $\forall k \in \mathcal{K}$.

In the step S630 in which the t-th iteration is performed, the beam characteristic message generation operation defined in Equation 6c may be performed. In other words, it may be performed on the individual k-th user vertex using the beam characteristic operator $\mathcal{D}(\bullet)$. To this end, the k-th user vertex may use a pooling-operated vector $m_k^{[t]} \in \mathbb{R}^{2\Omega}$ of the antenna combined message vector, which is obtained by pooling the antenna combined message vector $m_k^{[t]} \in \mathbb{R}^{2\Omega}$ corresponding to the antenna messages received from all antenna vertices connected to itself as in Equation 7d through a pooling operator, as input data for the determination operator $\mathcal{D}(\bullet)$. In addition, in order to generate a user message in the next (t+1)-th iteration, the k-th user vertex may calculate the antenna message vector $a_k^{[t]}$ by extracting the antenna message $a_{m,k}^{[t]}$ from the antenna combined message vector $m_{m,k}^{[t]}$ corresponding to antenna messages received from all antenna vertices $m \in \mathcal{M}$ and applying the pooling operator thereto.

In a step S640, it may be identified whether the iteration count value t reaches T which is a preset number of iterations. If the predetermined T iterations are not completed, the iteration count value t may be increased by 1 in a step S645, and the steps S610 to S630 may be performed again.

When it is confirmed in the step S640 that the iteration count value t reaches T, a beam forming vector may be calculated in a step S650.

As described above, a series of vertex operations of Equation 6, which are performed by iterating the procedures of the steps S610 to S630 T times, may be performed. In other words, the user message operation in Equation 6a, the antenna message operation in Equation 6b, and the beam characteristic determination operation in Equation 6c may be iteratively performed. These operations may be operations for determining the beam characteristic, that is, the final beam characteristic message, $s_k^{[T]}$. The beam forming vector W may be obtained by collecting the final beam characteristics $\{s_k^{[T]}; \forall k \in \mathcal{K}\}$ determined from all user vertices and substituting them into Equation 5 described above.

The vertex operators used in the BMP inference procedure described above are designed so that their input and output are independent of the network size, that is, the number of users and the number of antennas. The vertex operators in Equation 6 may be modeled with deep neural networks (DNNs), which are parameterized intelligences. In the present disclosure, description will be made using fully-connected DNNs as an example. However, various forms of DNNs may be used. For an input vector $i \in \mathbb{R}^{N_0}$ of a length N0, calculations $\mathcal{F}_L(i; \Theta)$ of the L-layer DNN having with a trainable parameter set $\Theta$ may be given as Equation 15 below.

$$\mathcal{F}_L(i; \Theta) \triangleq \delta_L(W_L \times \ldots \times \delta_1(W_1 i + o_1) + \ldots + o_L) \quad \text{[Equation 15]}$$

Here, $\delta_l(\bullet)$, l=1, . . . , L is an activation function of the l-th layer, and when Ni denotes the output dimension of the l-th layer, $W_l \in \mathbb{R}^{N_{l-1} \times N_l}$ and $o_l \in \mathbb{R}^{N_l}$ represent a weight matrix and a bias vector, respectively, and they constitute a set of trainable parameters $\Theta \triangleq \{W_l, o_l; \forall l\}$. The operators $\mathcal{U}(\bullet)$, $\mathcal{A}(\bullet)$, and $\mathcal{D}(\bullet)$ described in Equation 6 may be designed as shown in Equation 16 below with $\mathcal{F}_{L_\mathcal{U}}(i_\mathcal{U}; \Theta_\mathcal{U})$, $\mathcal{F}_{L_\mathcal{A}}(i_\mathcal{A}; \Theta_\mathcal{A})$, and $\mathcal{F}_{L_\mathcal{D}}(i_\mathcal{D}; \Theta_\mathcal{D})$ DNNs.

$$u_{k,i}^{[t]} = \mathcal{U}(s_k^{[t-1]}, a_k^{[t-1]}, h_{k,i}) = \mathcal{F}_{L_\mathcal{U}}(s_k^{[t-1]}, a_k^{[t-1]}, h_{k,i}; \Theta_\mathcal{U})$$

$$a_{i,k}^{[t]} = \mathcal{A}(m_{i,k}^{[t-1]}, u_i^{[t]}, h_{k,i}) = \mathcal{F}_{L_\mathcal{A}}(m_{i,k}^{[t-1]}, u_i^{[t]}, h_{k,i}; \Theta_\mathcal{A})$$

$$s_k^{[t]} = \mathcal{D}(m_k^{[t]}) = \mathcal{F}_{L_\mathcal{D}}(m_k^{[t]}; \Theta_\mathcal{D}) \quad \text{[Equation 16]}$$

In the following description, for convenience of description, the first line of Equation 16 will be referred to as 'Equation 16a', and $\mathcal{F}_{L_\mathcal{U}}(s_k^{[t-1]}, a_k^{[t-1]}, h_{k,i}; \Theta_\mathcal{U})$, $\mathcal{F}_{L_\mathcal{U}}$, or a DNN that outputs a user message using a method according to the present disclosure will be referred to as a 'user message generation DNN' in the following description.

In addition, the second line of Equation 16 will be referred to as 'Equation 16b', and $\mathcal{F}_{L_\mathcal{A}}(m_{i,k}^{[t-1]}, u_i^{[t]}, h_{k,i}; \Theta_\mathcal{A})$, $\mathcal{F}_{L_\mathcal{A}}$, or a DNN that outputs an antenna message using a method according to the present disclosure will be referred to as an 'antenna message generation DNN' in the following description.

In addition, the third line of Equation 16 will be referred to as 'Equation 16c', and $\mathcal{F}_{L_\mathcal{D}}(m_k^{[t]}; \Theta_\mathcal{D})$, $\mathcal{F}_{L_\mathcal{D}}$, or a DNN that outputs a beam characteristic message using a method according to the present disclosure will be referred to as a 'beam characteristic message generation DNN' in the following description.

In Equation 16, $\mathbf{i}_\mathcal{U} = \{s_k^{[t-1]}, a_k^{[t-1]}, h_{k,i}\} \in \mathbb{R}^{\Omega+4}$, $\mathbf{i}_\mathcal{A} = \{m_{i,k}^{[t-1]}, u_i^{[t]}, h_{k,i}\} \in \mathbb{R}^{3\Omega+2}$, and $\mathbf{i}_\mathcal{D} = m_k^{[t]} \in \mathbb{R}_2$ may be the input vectors of the corresponding DNNs, and trainable parameter sets therefor may be denoted as $\Theta_\mathcal{U}$, $\Theta_\mathcal{A}$, and $\Theta_\mathcal{D}$. Equation 16 may be regarded as approximating the operators $\mathcal{U}(\bullet)$, $\mathcal{D}(\bullet)$, and $\mathcal{D}(\bullet)$ with $\mathcal{F}_{L_\mathcal{U}}(\mathbf{i}_\mathcal{U}; \Theta_\mathcal{U})$, $\mathcal{F}_{L_\mathcal{A}}(\mathbf{i}_\mathcal{A}; \Theta_\mathcal{A})$, and $\mathcal{F}_{L_\mathcal{D}}(\mathbf{i}_\mathcal{D}; \Theta_\mathcal{D})$ DNNs, respectively, but it has been theoretically shown that DNNs can approximate arbitrary functions within a small error. Therefore, the optimality of the DNN models in Equation 16 is guaranteed.

Figure 7A:
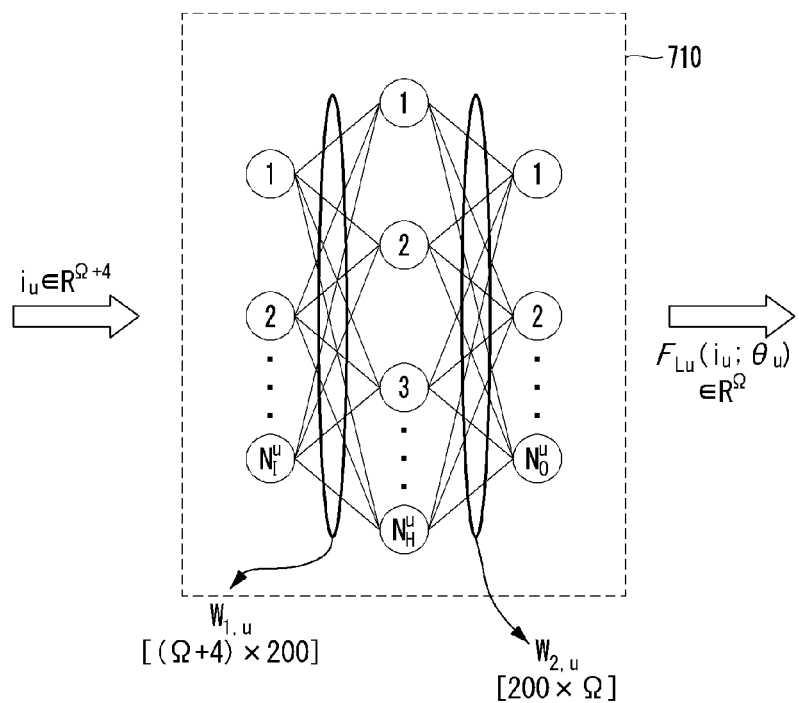
FIG. 7A is an exemplary diagram of a user message generation DNN.
Figure 7B:
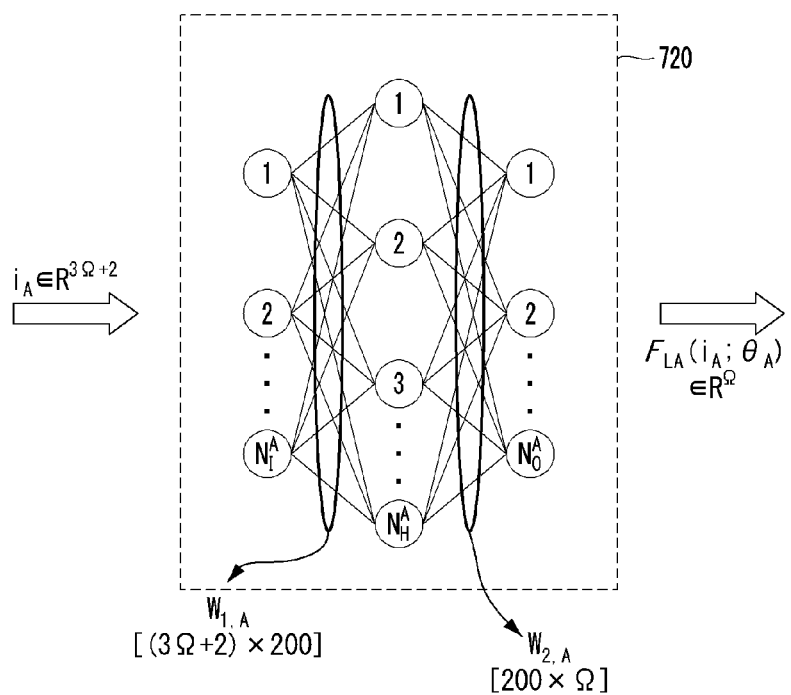
FIG. 7B is an exemplary diagram of an antenna message generation DNN.
Figure 7C:
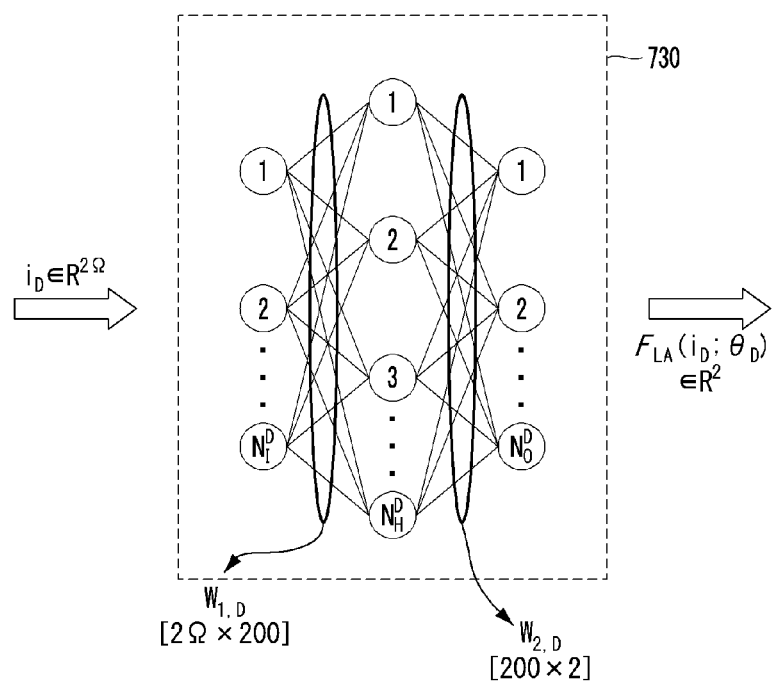
FIG. 7C is an exemplary diagram of a beam characteristic message generation DNN.

FIG. 7A is an exemplary diagram of a user message generation DNN, FIG. 7B is an exemplary diagram of an antenna message generation DNN, and FIG. 7C is an exemplary diagram of a beam characteristic message generation DNN.

FIGS. 7A to 7C illustrate the structures of DNNs that perform basic operation functions of BMP inference according to an exemplary embodiment of the present disclosure. The structures of the DNNs 710, 720, and 730 in FIGS. 7A to 7C may be all fully-connected DNNs each composed of an input layer, one hidden layer, and an output layer. The number Ni of neurons constituting the input layer for each DNN may be $N_I^\mathcal{U} = \Omega+4$, $N_I^\mathcal{A} = 3\Omega+2$, and $N_I^\mathcal{D} = 2\Omega$ to suit the input dimensionality of each of the DNNs 710, 720, and 730, the number $N_O^*$ of neurons constituting the single hidden layer for each DNN may be 200, and the number $N_O^*$ of neurons constituting the output layer for each DNN may be $N_O^\mathcal{U} = \Omega$, $N_O^\mathcal{A} = \Omega$, and $N_O^\mathcal{D} = 2$ to suit the output dimension of each of the DNNs 710, 720, and 730.

Figure 8:
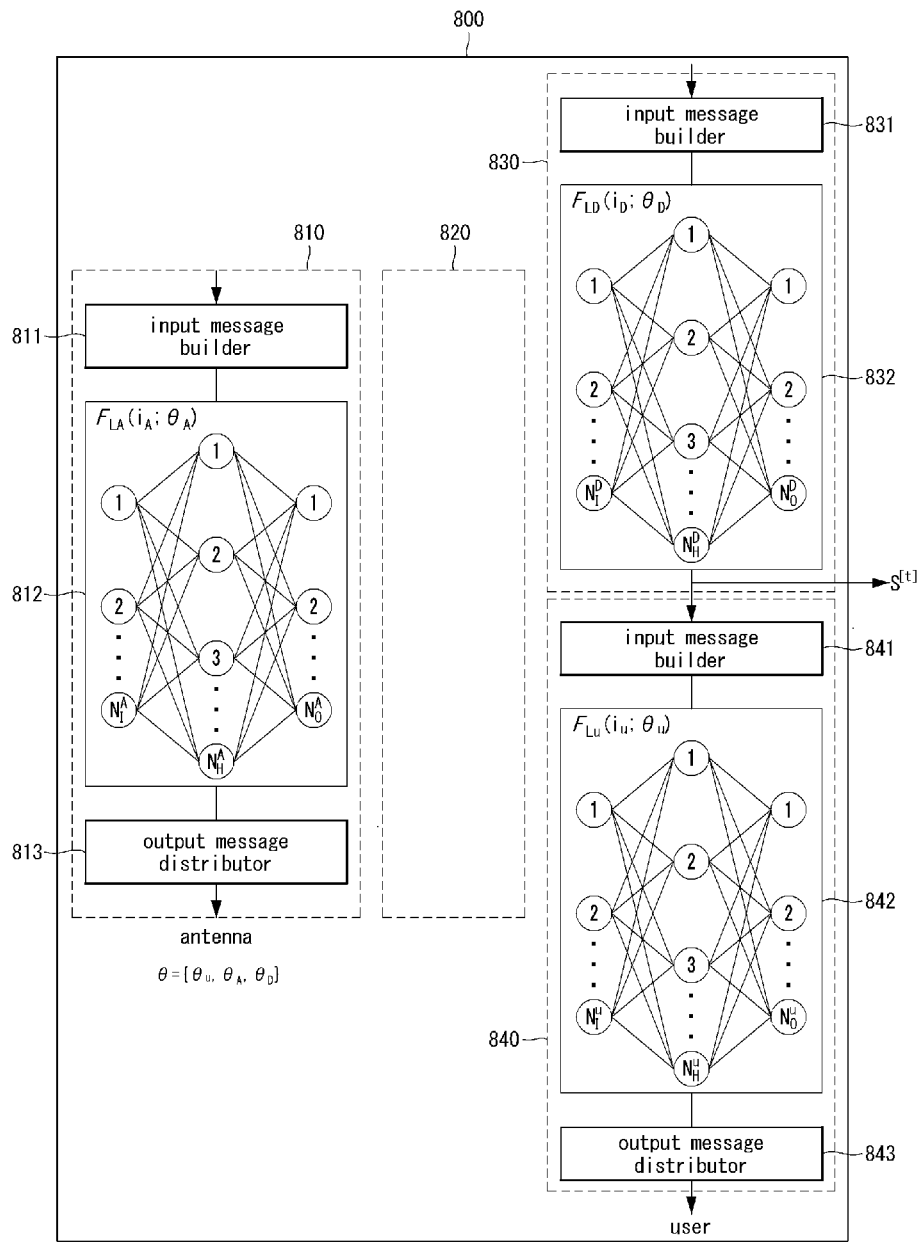
FIG. 8 is a basic structural diagram of a bipartite graph neural network for beam characteristic optimization according to the present disclosure.

FIG. 8 is a basic structural diagram of a bipartite graph neural network for beam characteristic optimization according to the present disclosure.

Referring to FIG. 8, it may include an antenna message generation DNN 810, a beam characteristic message generation DNN 830, a user message generation DNN 840, and a network 820 composed of antennas and users.

First, the network 820 may include a plurality of antennas 501 to 504, a plurality of users 521 to 523, and a channel 510, as described in FIG. 5. In other words, the network 820 may have the configuration shown in FIG. 5. Each antenna of the network 820 may include the antenna message generation DNN 810, or a layer above the antennas 501 to 504 may include the antenna message generation DNN 810. Each of the users 521 to 523 of the network may include (or be equipped with) the beam characteristic message generation DNN 830 and the user message generation DNN 840.

The antenna message generation DNN 810 may include an input message builder 811, a DNN 812, and an output message distributor 813. The output message distributor 813 may be an interface for transmitting an output of the DNN 812 to the user. Here, the DNN 812 may be a DNN that actually generates an antenna message. The input message builder 811 may be an interface for generating an input to the DNN 812. Therefore, the antenna message generation DNN may be referred by either reference numeral 810 or 812.

The beam characteristic message generation DNN 830 may include an input message builder 831 and a DNN 832. The input message generator 831 may be an interface for generating an input to the DNN 832. Here, the DNN 832 may be a DNN that actually generates a beam characteristic message. Therefore, the beam characteristic message generation DNN may be referred by either reference numeral 830 or 832.

The user message generation DNN 840 may include an input message builder 841, a DNN 842, and an output message distributor 843. The input message builder 841 may be an interface for generating an input to the DNN 842. The output message distributor 843 may be an interface for transmitting an output of the DNN 842 to the antenna. Here, the DNN 842 may be a DNN that actually generates a user message. Therefore, the user message generation DNN may be referred by either reference numeral 840 or 842.

The final goal of the bipartite graph neural network illustrated in FIG. 8, that is, the final goal in the present disclosure, is that each of the user message generation DNN, antenna message generation DNN, and beam characteristic message generation DNN operate well at any network size, regardless of antenna and user indices. Therefore, given an arbitrary network size, a bipartite graph may be formed consisting of antenna nodes and user nodes, an identical antenna message generation DNN $\mathcal{F}_{L_\mathcal{A}}(\mathbf{i}_\mathcal{A}; \Theta_\mathcal{A})$ may be arranged at each antenna node, an identical user message generation DNN $\mathcal{F}_{L_\mathcal{U}}(\mathbf{i}_\mathcal{U}; \Theta_\mathcal{U})$ and an identical beam characteristic message generation DNN $\mathcal{F}_{L_\mathcal{D}}(\mathbf{i}_\mathcal{D}; \Theta_\mathcal{D})$ may be arranged at each user node, and an optimal beamforming vector may be derived through interaction between the nodes, that is, through the BMP inference process.

As well expressed in Equation 16 above, the same DNNs may be used in the present disclosure regardless of the input/output data indices. In addition, by combining Equation 16, a beam characteristic optimization neural network $\tilde{\mathcal{D}}(H)$ with a trainable parameter set $\Theta \triangleq \{\Theta_\mathcal{U}, \Theta_\mathcal{A}, \Theta_\mathcal{D}\}$ may be designed. Since BMP inference is performed by implementing vertex operators on a bipartite graph with the respective DNNs, the method according to the present disclosure may be named 'bipartite graph neural network (BGNN)'.

FIG. 8 may illustrate a basic structure of the BGNN proposed in the present disclosure. The BGNN basic structure may refer to DNNs and their interactions that implement a series of operations at t=n in the BMP inference of FIG. 6 described above. The input message builders 811, 831, and 841 and the output message distributors 813 and 843 in FIG. 8 may be used to train a single DNN or apply it to a real system regardless of the antenna or user indices. The input message builders 811, 831, and 841 may perform functions for building input data $\mathbf{i}_\mathcal{U}$, $\mathbf{i}_\mathcal{A}$, and $\mathbf{i}_\mathcal{D}$ for the three DNNs $\mathcal{F}_{L_\mathcal{U}}(\mathbf{i}_\mathcal{U}; \Theta_\mathcal{U})$, $\mathcal{F}_{L_\mathcal{A}}(\mathbf{i}_\mathcal{A}; \Theta_\mathcal{A})$, and $\mathcal{F}_{L_\mathcal{D}}(\mathbf{i}_\mathcal{D}; \Theta_\mathcal{D})$, respectively. The output message distributors 813 and 843 may configure output messages of $\mathcal{F}_{L_\mathcal{U}}(\mathbf{i}_\mathcal{U}; \Theta_\mathcal{U})$ and $\mathcal{F}_{L_\mathcal{A}}(\mathbf{i}_\mathcal{A}; \Theta_\mathcal{A})$ and distribute them to the corresponding edges.

Hereinafter, a beam-characteristic derivation process for $H \in \mathbb{C}^{|\mathcal{K}| \times |\mathcal{M}|}$ through the interactions of the three DNNs described above will be described with reference to FIGS. 9 to 11. In the entire BGNN training procedure according to the present disclosure, which will be described in FIGS. 12 and 13 below, at least one of the procedures in FIGS. 9 to 11 to be described below may be an operation process of DNNs for BMP inference at the t-iteration stage for one sample $H \in \mathbb{C}^{|\mathcal{K}| \times |\mathcal{M}|}$.

Figure 9:
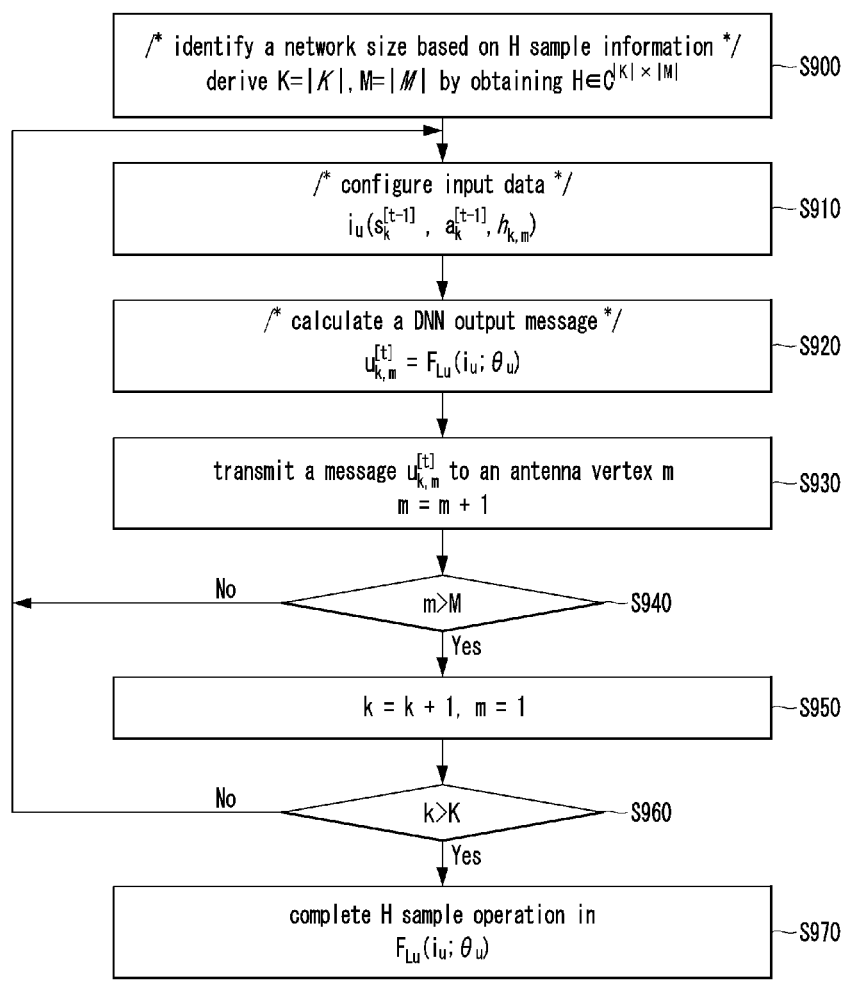
FIG. 9 is a flowchart when an user message generation DNN operates to generate a user message for one channel sample in the BGNN according to the present disclosure.

FIG. 9 is a flowchart when an user message generation DNN operates to generate a user message for one channel sample in the BGNN according to the present disclosure.

FIG. 9 illustrates an example of the BGNN composed of three DNNs, and may illustrate an operation of the user message generation DNN 840 previously illustrated in FIG. 8. Therefore, in the following description, the procedure of FIG. 9 will be described assuming the operation of the user message generation DNN 840.

In a step S900, given a channel sample $H \in \mathbb{C}^{|\mathcal{K}| \times |\mathcal{M}|}$ for a channel, the user message generation DNN 840 may identify (or derive or acquire) a network size for the sample, that is, the number of users and the number of antennas. Channel gain information between the antenna and the user may be given from the channel sample.

User message generation may involve generating information to be shared from user vertices to antenna vertices. For this purpose, it may be considered that messages are generated sequentially in the order of the user vertex indices and in the order of the antenna vertex indices connected to the user vertex. In other words, messages to be delivered from a user vertex 1 to connected antenna vertices may be sequentially generated and delivered. In addition, an operation of generating and delivering a message from the next user vertex, for example from a user vertex 2, to its antenna vertices, may be continuously performed.

For the operation described above, in the step S900, the user message generation DNN 840 may set a user vertex count value k to 1 for the user vertex 1 and an antenna vertex count value m to 1 for an antenna vertex 1. This may be a procedure for setting indices to share information between the user vertex 1 and the antenna vertex 1.

In order to share information in a step S910, the user message generation DNN 840 may first configure the input data i $\mathcal{U} = (s_k^{[t-1]}, a_k^{[t-1]}, h_{k,m})$ of the user message generation DNN $\mathcal{F}_{L_u}(\mathbf{i}_{\mathcal{U}}; \Theta_{\mathcal{U}})$. Here, information $s_k^{[t-1]}$ and $a_k^{[t-1]}$ may be past information generated in a procedure $\mathcal{F}_{L_D}(\mathbf{i}_D; \Theta_D)$ to be described later.

In a step S920, the user message generation DNN 840 may calculate a user message $u_{k,m}^{[t]}$ as described in Equation 6A. Here, it may be calculated as $u_{k,m}^{[t]} = \mathcal{F}_{L_u}(\mathbf{i}_{\mathcal{U}}; \Theta_{\mathcal{U}})$.

In a step S930, the user message generation DNN 840 may deliver the calculated user message to the antenna vertex m. Then, the count value m may be increased by 1 to generate information for the next antenna vertex.

In a step S940, the user message generation DNN 840 may check whether the antenna count value m is equal to the number M of antennas constituting the network size. If the antenna count value does not increase by the number of antennas constituting the network size, the steps S910 to S930 may be repeated. The beam characteristic message generation DNN 830 may proceed to a step S950 if the antenna count value is greater than the number M of antennas constituting the network size as a result of checking in the step S940. Therefore, the step S940 may be an operation to repeat until user messages are delivered from one user vertex to all antennas.

In a step S950, the user message generation DNN 840 may increase the user count value k by 1 and reset the antenna count value m to 1. This may be a configuration operation to allow the next user to deliver user messages to the antennas.

In a step S960, the user message generation DNN 840 may check whether the user count value k is greater than the number of users constituting the network size. The step S960 may be a procedure to ensure that all user vertices deliver user messages to antenna vertices.

If all user vertices have delivered the user messages to all antenna vertices as a result of checking in step S960, the user message generation DNN 840 may proceed to a step S970. Otherwise, it may proceed to the step S910 and repeat the procedures described above.

In the step S970, the user message generation DNN 840 may complete the operation for generating $\mathcal{F}_{L_u}(\mathbf{i}_{\mathcal{U}}; \Theta_{\mathcal{U}})$ for the given channel sample H. In the following description, $\mathcal{F}_{L_u}(\mathbf{i}_{\mathcal{U}}; \Theta_{\mathcal{U}})$ will be referred to as 'user message by DNN'.

Figure 10A:
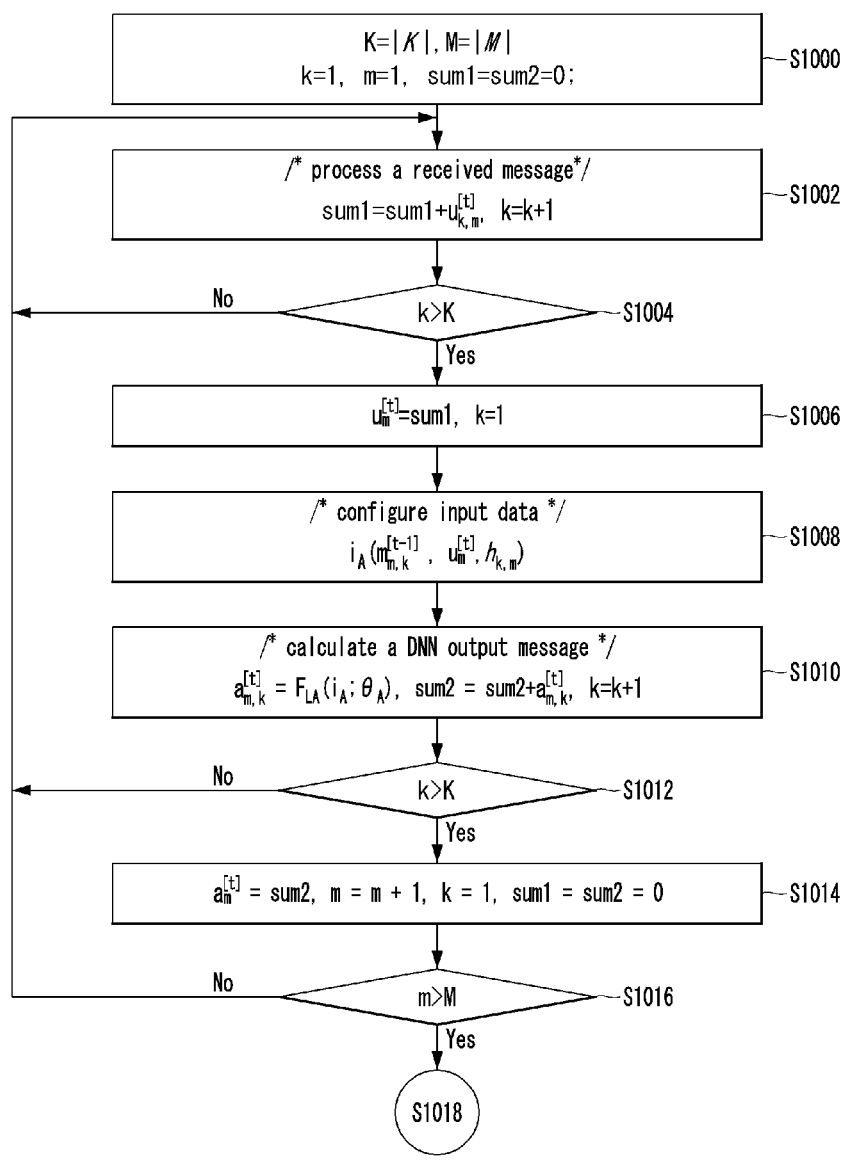
FIG. 10A is a partial flowchart when an antenna message generation DNN operates to generate an antenna message for one channel sample in the BGNN according to the FIG. 10B is a remaining flowchart when an antenna message generation DNN operates to generate an antenna message for one channel sample in the BGNN according to the present disclosure.
Figure 10B:
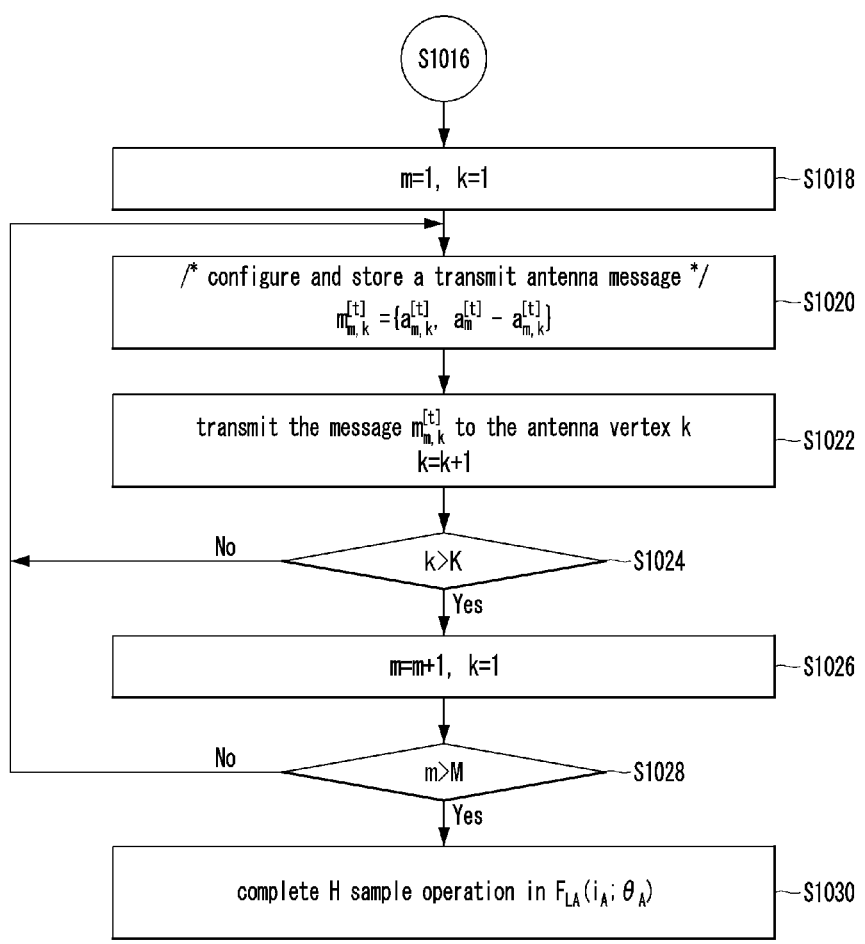

FIG. 10A is a partial flowchart when an antenna message generation DNN operates to generate an antenna message for one channel sample in the BGNN according to the present disclosure, and FIG. 10B is a remaining flowchart when an antenna message generation DNN operates to generate an antenna message for one channel sample in the BGNN according to the present disclosure.

FIGS. 10A and 10B illustrate an example of a BGNN composed of three DNNs, which illustrate an operation of the antenna message generation DNN 810 $\mathcal{F}_{L_A}(\mathbf{i}_A; \Theta_A)$ illustrated in FIG. 8 and illustrate an operational procedure for one channel sample. Therefore, in the following description, the procedure of FIGS. 10A and 10B will be described assuming the operation of the antenna message generation DNN 810. In addition, an input of the antenna message generation DNN 810 may be generated by the input message builder 811, and may be input to the DNN 811 or the antenna message generation DNN 811.

In a step S1000, the antenna message generation DNN 810 may obtain information on a network size, that is, the number of users and the number of antennas, from the channel sample, given the channel sample $H \in \mathbb{C}^{|\mathcal{K}| \times |\mathcal{M}|}$. In addition, channel gain information between the antenna and the user may be given from the channel sample. Also in FIGS. 10A and 10B, it may be considered that messages are received, processed, and generated in the order of the antenna vertex indices and the user vertex indices.

Accordingly, the antenna message generation DNN 810 may set a count value k for counting the number of users to 1 and set a count value m for counting the number of antennas to 1. Both a first sum value sum1 and a second sum value sum2, which will be described below, may be set to an initial value (e.g., zero).

In order to configure $\mathbf{i}_A$, which is input data of the antenna message generation DNN 810, the user vertex message input for each antenna vertex should be pooling-operated. For this purpose, the antenna message generation DNN 810 may calculate a sum of the user messages $u_{k,m}^{[t]}$, $\forall k$ received from all user vertices connected to the given antenna vertex, and calculate a result sum1 thereof as the user message vector $u_m^{[t]}$.

In other words, the antenna message generation DNN 810 may calculate sum1 for the user k in a step S1002 and then increase k by 1. The antenna message generation DNN 810 may check whether the user count value k is greater than the total number K of users in a step S1004. If the user count value k is greater than the total number K of users, the antenna message generation DNN 810 may proceed to a step S1006. Otherwise, the step S1002 may be repeated.

The steps S1002 and S1004 described above may be a procedure for performing a summing operation of sum1 until the user count value k becomes the total number K of users.

Proceeding to the step S1006, the antenna message generation DNN 810 may calculate sum1, which is the result of calculating the sum of the user messages $u_{k,m}^{[t]}$, $\forall k$ received from all user vertices connected to the given antenna vertex, as the user message vector $u_m^{[t]}$. Then, the user count value k may be set to 1 again.

In order to derive information to be delivered from the antenna vertex m to the user vertex k through DNN operation, the antenna message generation DNN 810 may configure input data $(m_{m,k}^{[t-1]}, u_m^{[t]}, h_{k,m})$ in a step S1008, Here, $m_{m,k}^{[t-1]}$ may be an antenna combined message vector derived in the previous step and may be information as described in Equation 7c. By applying the input data $\mathbf{i}_\mathcal{A}$ to $\mathcal{F}_{L_\mathcal{A}}(\mathbf{i}_\mathcal{A}; \Theta_\mathcal{A})$, the antenna message $a_{m,k}^{[t]}$, which is an output message, may be calculated, and a sum pooling operation of the antenna messages may be performed through the variable sum2.

In other words, in the step S1008, the antenna message generation DNN 810 may calculate the input data $(m_{m,k}^{[t-1]}, u_m^{[t]}, h_{k,m})$, and in the step S1010, it may generate the antenna message $a_{m,k}^{[t]}$ using the input data. Then, the antenna message generation DNN 810 may add the generated antenna message to the variable sum2 and increase the user count value k by 1. Thereafter, the antenna message generation DNN 810 may check whether the user count value k is greater than the total number K of users in a step S1012. As a result of checking in the step S1012, if the user count value k is greater than the total number K of users, the antenna message generation DNN 810 may proceed to a step S1014, and if the user count value k is not greater than the total number K of users, the steps S1002 to S1010 may be performed repeatedly.

In order to generate a message to be delivered from the antenna vertex m to the next user vertex, the count value k may be increased by 1 and the above process may be iterated. In addition, when information generation for all user vertices is completed at the antenna vertex m, sum2, which is a result of a sum pooling operation on $a_{m,k}^{[t]}$, may be stored in the antenna message vector $a_m^{[t]}$ for the antenna m. In addition, for the next antenna vertex operation, the count value m may be increased by 1 and the count value k may be initialized to 1. The variables sum1 and sum2 may be also initialized and the above operation may be iterated.

Describing again the operations described above, in the step S1014, the antenna message generation DNN 810 may configure sum2 as the antenna message vector $a_m^{[t]}$ for the antenna m, increase the count value m by 1, and set the count value k to 1. Then, in the step S1014, the antenna message generation DNN 810 may reset both variables sum1 and sum2 to zero.

The antenna message generation DNN 810 may check whether the antenna count value m is greater than the total number M of antennas in s step S1016. As a result of checking in the step S1016, if the antenna count value m is greater than the total number K of antennas, the process may proceeds to a step S1018. If the count value m is less than the total number M of antennas, the steps S1002 to S1010 may be performed iteratively. Through this, the above procedure may be performed for all antennas.

After completing the above process for all antenna vertices given as channel samples, the antenna combined message vector $m_{m,k}^{[t]}$ as illustrated in Equation 7c may be delivered to all user vertices in the order of antenna vertex indices. To this end, first, both the antenna count value m and the user count value k may be reset to 1. The antenna message to be delivered may be configured as the antenna combined message vector $m_{m,k}^{[t]} = \{a_{m,k}^{[t]}, a_m^{[t]} - a_{m,k}^{[t]}\}$. Then, the message $m_{m,k}^{[t]}$ may be delivered to the user vertex k. To deliver the message to the next user vertex, the count value k may be increased by 1 and the above process may be repeated.

In other words, both the antenna count value m and the user count value k may be reset to 1 in the step S1018.

The antenna message generation DNN 810 may generate the antenna combined message vector $m_{m,k}^{[t]} = \{a_{m,k}^{[t]}, a_m^{[t]} - a_{m,k}^{[t]}\}$ as the antenna message to be delivered in a step S1020, and deliver the antenna combined message vector to the user vertex k in a step S1022. Then, the antenna message generation DNN 810 may increase the user count value k by 1.

In a step S1024, the antenna message generation DNN 810 may check whether the user count value k is greater than the total number K of users. As a result of checking in the step S1024, if the user count value k is greater than the total number K of users, the process may proceed to a step S1026. Otherwise, the steps S1020 to S1022 may be performed repeatedly.

In the step S1026, the antenna message generation DNN 810 may increase the antenna count value m by 1 and reset the user count value k to 1. In step S1028, it may be checked whether the antenna count value m is greater than the total number M of antennas. If the antenna count value m is greater than the total number M of antennas, that is, if the antenna combined message vectors for all antennas are delivered to all users, the channel sample operation may be completed in a step S1030.

If the antenna count value m is not greater than the total number M of antennas, the antenna message generation DNN 810 may repeatedly perform the steps S1020 to S1026.

Through the procedure described above, the operation of generating $\mathcal{F}_{L_\mathcal{A}}(\mathbf{i}_\mathcal{A}; \Theta_\mathcal{A})$ for the given channel sample H may be completed. In the following description, $\mathcal{F}_{L_\mathcal{A}}(\mathbf{i}_\mathcal{A}; \Theta_\mathcal{A})$ will be referred to as 'antenna message by DNN'.

Figure 11:
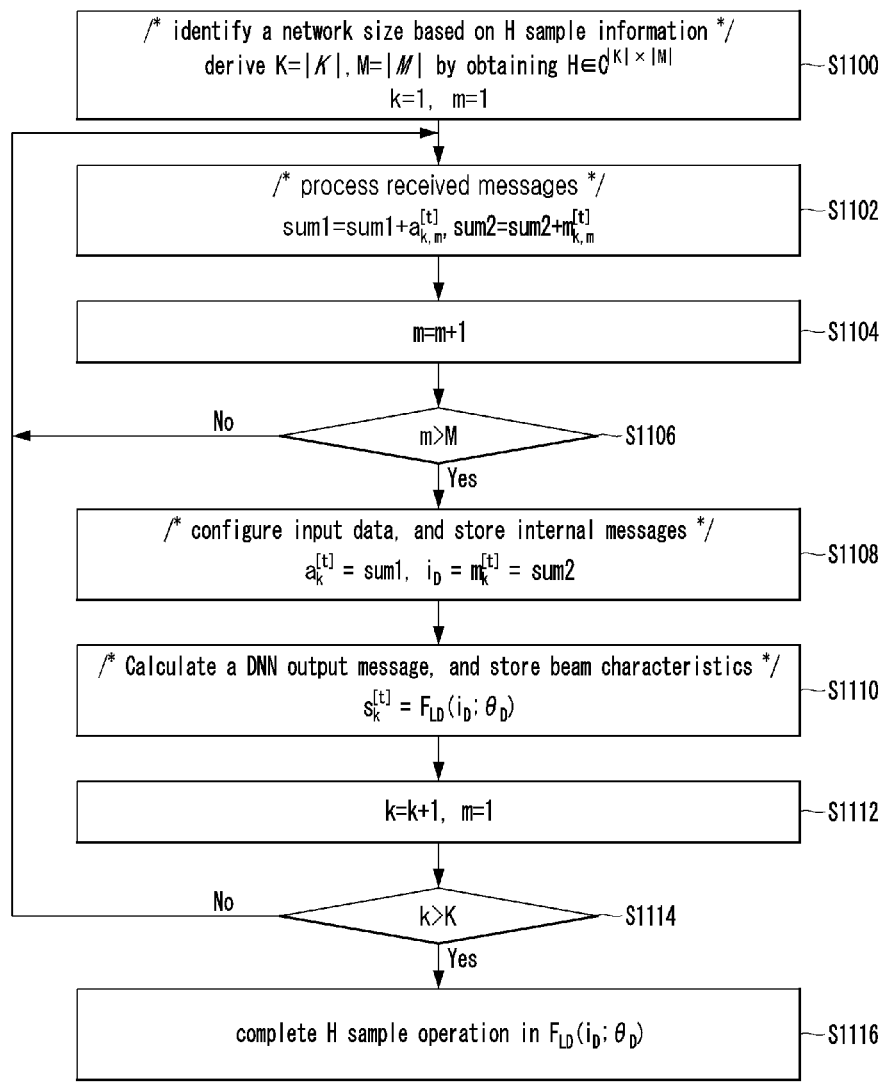
FIG. 11 is a flowchart when a user message generation DNN operates to generate a user message for one channel sample in the BGNN according to the present disclosure.

FIG. 11 is a flowchart when a user message generation DNN operates to generate a user message for one channel sample in the BGNN according to the present disclosure.

FIG. 11 illustrates an example of the BGNN composed of three DNNs, and may illustrate the operation of the beam characteristic message generation DNN 830 previously illustrated in FIG. 8. Therefore, in the following description, the procedure of FIG. 11 will be described assuming the operation of the beam characteristic message generation DNN 830.

As previously described in FIGS. 9 and 10A, given the channel sample $H \in \mathbb{C}^{|\mathcal{K}| \times |\mathcal{M}|}$ for the channel in step S1100, the beam characteristic message generation DNN 830 may identify (or derive or acquire) a network size for the sample, that is, the number of users and the number of antennas. In step S1100, the beam characteristic message generation DNN 830 may set the user vertex count value k to 1 for the user vertex 1 and the antenna vertex count value m to 1 for the antenna vertex 1. This may be a procedure for setting index values to share information between the user vertex 1 and the antenna vertex 1. In other words, input data to be applied to the beam characteristic message generation DNN 830 may be sequentially determined with respect to the user vertex indexes and the antenna vertex indexes.

In step S1102, the beam characteristic message generation DNN 830 may sequentially receive the antenna combined message vector $m_{m,k}^{[t]}$ received at the user vertex 1 from the antenna vertices connected to it, and extract the antenna message $a_{m,k}^{[t]}$ included in the antenna combined message vector message. The two pieces of information may be stored in the first variable sum1 and the second variable sum2 for a sum pooling operation, respectively. In other words, the extracted antenna message $a_{m,k}^{[t]}$ may be added to the first variable sum1 to update the first variable sum1, and the antenna combined message vector $m_{m,k}^{[t]}$ may be added to the second variable sum1 to update the second variable sum2.

Then, in step S1104, the beam characteristic message generation DNN 830 may increase the antenna count value m by 1, and in step S1106, it may check whether the antenna count value m is greater than the total number M of antennas in step S1106. As a result of checking in step S1106, if the antenna count value m is greater than the total number M of antennas, the beam characteristic message generation DNN 830 may proceed to step S1108. Otherwise, steps S1102 to S1104 may be iteratively performed.

In a step S1108, the beam characteristic message generation DNN 830 may configure input data and store internal messages. For example, the beam characteristic message generation DNN 830 may store the antenna message vector $a_k^{[t]}$, which is the result of pooling the antenna message $a_{m,k}^{[t]}$ stored in the first variable sum1, as the first variable sum1. In this case, the value stored in the first variable sum1 may be used to generate the user message previously described in FIG. 9. In the step S1108, the beam characteristic message generation DNN 830 may configure the input data $i_D = m_k^{[t]} = $ sum2 for the beam characteristic message generation DNN 840 by configuring the pooling result of the antenna combined message $m_{m,k}^{[t]}$ stored in the second variable sum2 as a pooling operation vector of the antenna combined vector $m_k^{[t]}$.

In a step S1110, the beam characteristic message generation DNN 830 may apply the input data $i_D$ to the beam characteristic message generation DNN 832 $\mathcal{F}_{L_D}(i_D; \Theta_D)$ to calculate the beam characteristic message $s_k^{[t]}$, which is an output message.

In a step S1112, the beam characteristic message generation DNN 830 may increase the user count value k by 1 and initialize the antenna count value m to 1 to perform a procedure for determining the beam characteristic of the next user vertex.

The beam characteristic message generation DNN 830 may check whether the user count value k is greater than the total number K of users in a step S1114. As a result of checking in step S1114, if the user count value k is greater than the total number K of users, the process may proceed to a step S1116. Otherwise, the steps S1102 to S1112 may be iteratively performed.

As described above, once the beam characteristic determination procedure for all user vertices is completed, the operation of calculating the beam characteristic $\mathcal{F}_{L_D}(i_D; \Theta_D)$ by the DNN for the given channel sample H may be completed.

Meanwhile, the beam characteristic optimization neural network designed as shown in FIG. 8 may be a deep learning beamforming optimizer 400 $W^{[t]}(\Theta)$ including the deep neural network 410 and the beam-recovery block 420 through Equation 5 as shown in FIG. 4, and the deep learning beamforming optimizer may be redefined as Equation 17 below.

$$W^{[t]}(\Theta) \triangleq \mathcal{V}_{(H, s^{[t]})} \quad \text{[Equation 17]}$$

Among a series of beam characteristics $s^{[1]}, \ldots, s^{[T]}$, the last beam characteristic value $s^{[T]}$ may be selected to obtain the final beamforming solution $W^{[T]}$. By substituting Equation 17 into Equation 4 described above, it may be transformed into a training problem expressed as Equation 18 below.

$$\max_{\Theta} U^{[T]}(\Theta) \triangleq \max_{\Theta} \mathbb{E}_{H, \mathcal{M}, \mathcal{K}}\left[U(\{R_k(H, W^{[T]}(\Theta)): \forall k \in \mathcal{K}\})\right] \quad \text{[Equation 18]}$$

In Equation 18, $U^{[t]}(\Theta)$ may represent an average utility obtained by the BGNN output $s^{[t]}$ of the t-th iteration.

Figure 12A:
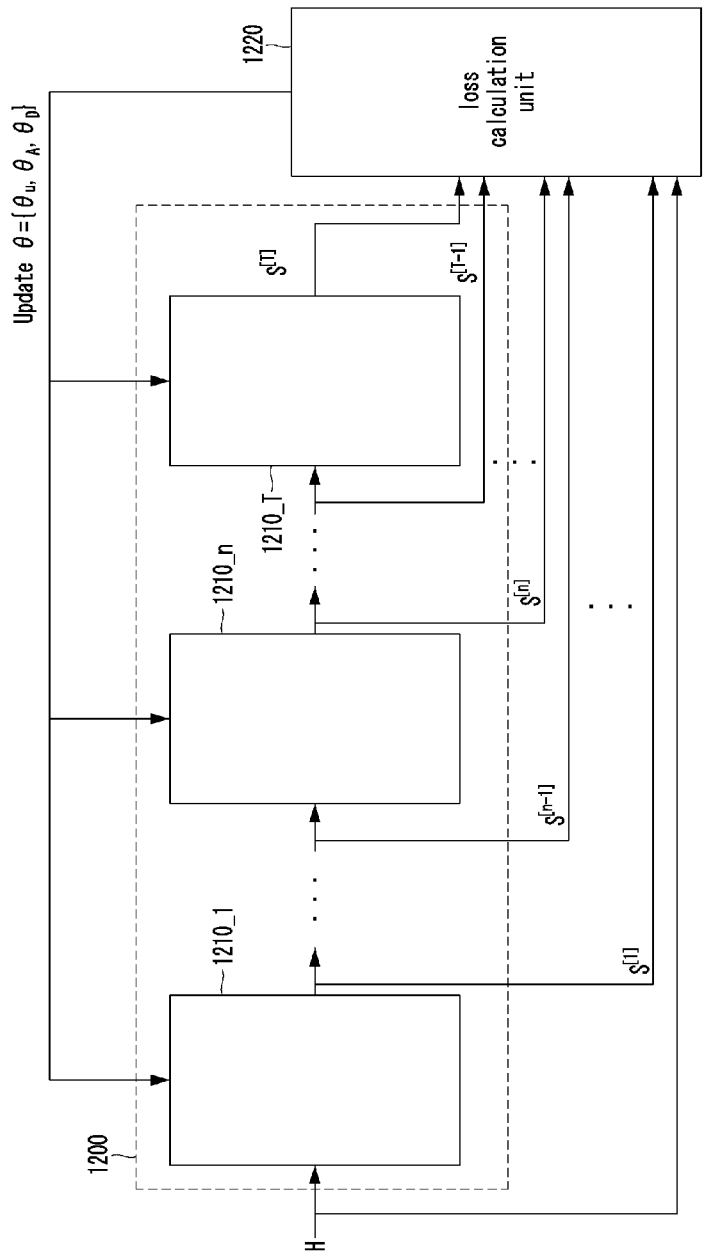
FIG. 12A is an exemplary diagram of a parameter update structure of a beam characteristic optimization deep neural network structure for a bipartite graph neural network according to the present disclosure.
Figure 12B:
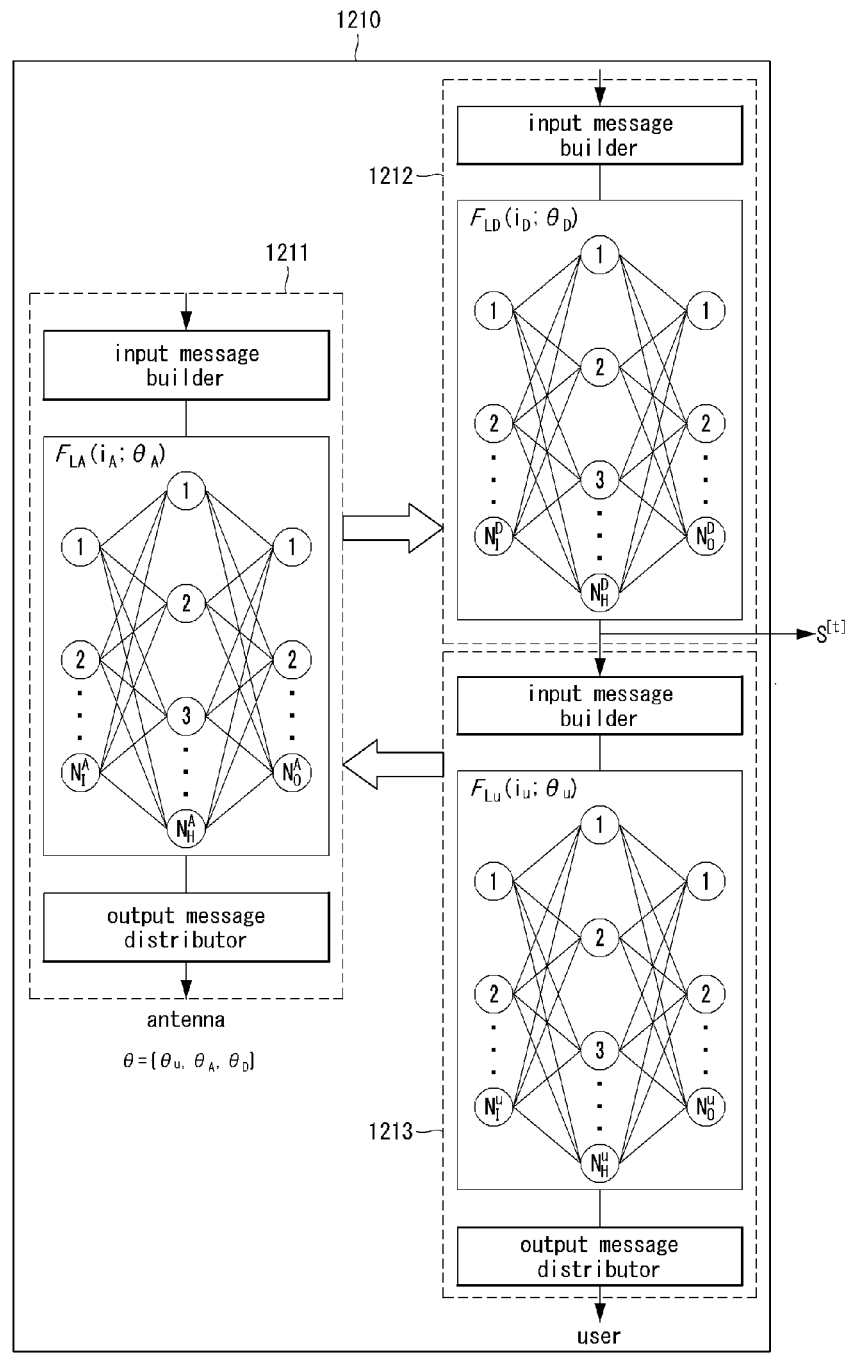
FIG. 12B is an internal configuration diagram of a beam characteristic optimization deep neural network structure for a bipartite graph neural network.

FIG. 12A is an exemplary diagram of a parameter update structure of a beam characteristic optimization deep neural network structure for a bipartite graph neural network according to the present disclosure, and FIG. 12B is an internal configuration diagram of a beam characteristic optimization deep neural network structure for a bipartite graph neural network.

Referring to FIG. 12, it may include a beam characteristic optimization deep neural network structure 1200 for a bipartite graph neural network and a loss calculation unit 1220 that calculates a loss using the beam characteristic optimization deep neural network structure 1200. In addition, inside the beam characteristic optimization deep neural network structure 1200 for a bipartite graph neural network, a plurality of beam characteristic optimization deep neural networks 1210_1, ..., 1210_n, ..., and 1201_T for bipartite graph neural networks may be connected in series. Therefore, the beam characteristic optimization deep neural network 1210_1 for a first bipartite graph neural network may outputs a first optimal beam characteristic value $s^{[1]}$, the beam characteristic optimization deep neural network 1210_n for an n-th bipartite graph neural network may output an n-th optimal beam characteristic value $s^{[n]}$, and the final beam characteristic optimization deep neural network 1210_T for a T-th bipartite graph neural network may output a T-th optimal beam characteristic value $s^{[T]}$. The internal configuration of each of the beam characteristic optimization deep neural networks 1210_1, ..., 1210_n, ..., and 1201_T for the bipartite graph neural networks according to the present disclosure may all have the same structure.

The structure of each of the beam characteristic optimization deep neural networks 1210_1, ..., 1210_n, ..., and 1201_T for bipartite graph neural networks may include an antenna message generation DNN 1211, a user message generation DNN 1213, and a beam characteristic message generation DNN 1212, as illustrated in FIG. 12B. Through this structure, it is possible to construct a parameter update structure of the beam characteristic optimization deep neural network structure for the bipartite graph neural network.

In the configuration as illustrated in FIGS. 12A and 12B, optimization of the BGNN parameter Θ may be achieved through the existing training algorithms such as mini-batch 'stochastic gradient descent (SGD)' schemes. A forward pass of the BGNN may be constructed by BMP inference in an algorithm involving T iterative operations. These iterative calculations may be preferable for training convergent message-passing rules that allow a series of beam characteristics $s^{[1]}, \ldots, s^{[T]}$ to approach the optimal points. At the same time, BMP inference may integrate the three DNNs of Equation 16 described above into one deep architecture with T layers. Increasing T increases an expressive power of the BGNN, which is generally beneficial for discovering complex beamforming optimization rules. On the other hand, in the deep structures, there is a 'gradient vanishing' issue where a back-propagation algorithm fails to obtain valid gradients of the BGNN parameter Θ. Therefore, the value of T should be carefully determined.

As shown in FIGS. 12A and 12B, in the present disclosure, in order to solve the gradient vanishing issue while taking advantage of the deep structure, a new training objective function including utility values $U^{[t]}(\Theta)$ may be used in all iterative steps (i.e., t=1, ..., T) according to BMP inference. The new training objective function F(Θ) proposed in the present disclosure is given as Equation 19 below.

$$F(\Theta) = \sum_{t=1}^{T} U^{[t]}(\Theta) = \sum_{t=1}^{T} \mathbb{E}_{H,\mathcal{M},\mathcal{K}}[U(\{R_k(H, W^{[t]}(\Theta)): \forall k \in \mathcal{K}\})]$$

[Equation 19]

Unlike Equation 18, which only focuses on determining the final beam characteristic $s^{[T]}$, the use of the objective function in Equation 19 captures the entire trajectory of all beam characteristics $s^{[t]}$, $\forall t$. This provides various shortcuts to the error backpropagation algorithm to deliver valid gradients in the backward pass.

In the BGNN presented in the present disclosure, the vertex DNNs in Equation 16 are designed to accept their previous outputs as additional input data, which forms concatenation-based skip connections. The number of skip connections increases as the number N of antennas and the number K of users increase. This facilitates effective training of the BGNN and scalability to larger networks. In addition, the training objective proposed in the present disclosure is to optimize the intermediate beam characteristic $s^{[t]}$ to maximize the aggregated utility values $\Sigma_{t=1}^{T} U^{[t]}(\Theta)$ with its past and future decisions. Such a kind of incremental decision process may help the BGNN to gradually improve its utility performance $U^{[t]}(\Theta)$ as the iteration step t increases.

Equation 19, the training objective function described above, may be solved using the mini-batch SGD algorithm and its variants, namely Adam algorithm. At each training epoch, the parameter set $\Theta$ may be updated as shown in Equation 20 below.

$$\Theta \leftarrow \Theta + \eta \mathbb{E}_{\mathcal{B}}\left[\sum_{t=1}^{T} \nabla_{\Theta} U(\{R_k(H, W^{[t]}(\Theta)): \forall k \in \mathcal{K}\})\right]$$

[Equation 20]

Here, $\eta > 0$ represents a learning rate, $\nabla_{\Theta}$ represents a gradient operator for the variable $\Theta$, and $\mathcal{B}$ is a mini-batch set including a number of weighted bipartite graphs $\mathcal{G} = (\mathcal{M}, \mathcal{K}, H)$ constructed from pre-collected or known distributions.

Figure 13:
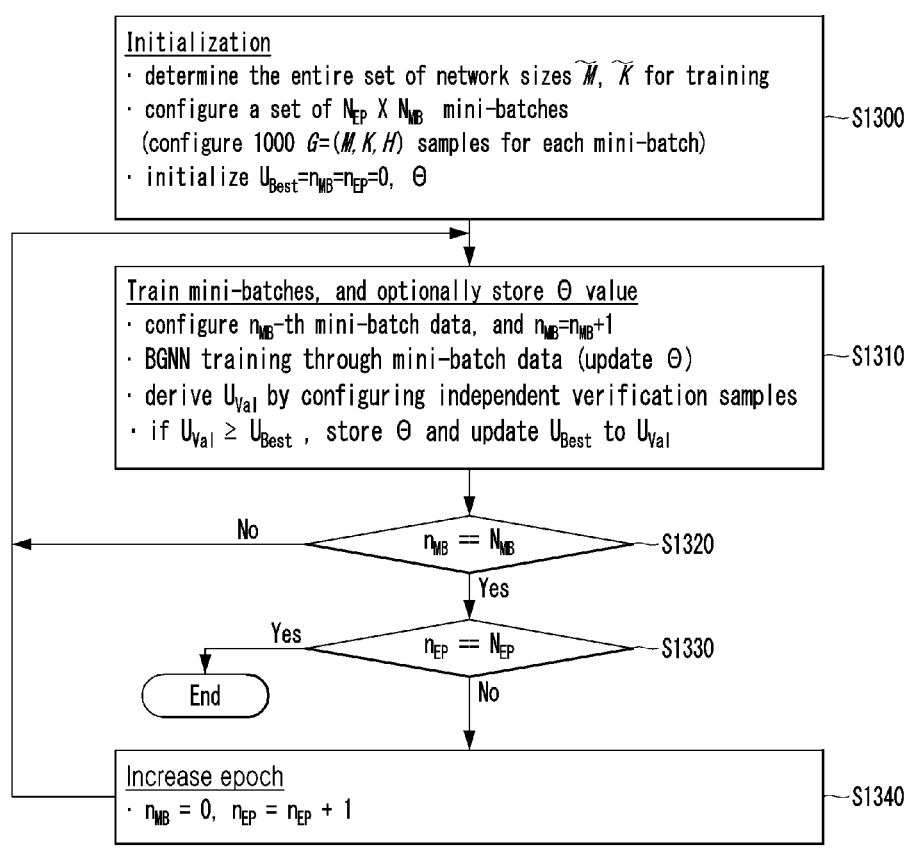
FIG. 13 is a flowchart for training of a BGNN according to the present disclosure.

FIG. 13 is a flowchart for training of a BGNN according to the present disclosure.

A step S1300 is a BGNN training initialization process and configures a training data set. If the entire set of network sizes constituting the training data set is given as $\widetilde{\mathcal{M}}$ and $\widetilde{\mathcal{K}}$, an antenna set $\mathcal{M}$ and an user set $\mathcal{K}$ may be arbitrarily selected from the entire set. For a given network size $M = |\mathcal{M}|$ and $K = |\mathcal{K}|$, corresponding channel samples $H \in \mathbb{C}^{K \times M}$ should be prepared. The above-described channel sample H may be obtained mathematically using a channel modeling method, or, as another example, may be obtained through actual experiment.

In an exemplary embodiment of the BGNN training shown in FIG. 13, the training data set may be divided into $N_{EP} \times N_{MB}$ mini-batch sets. Here, $N_{EP}$ is the number of training epochs, and $N_{MB}$ is the number of mini-batch sets used in one epoch. One mini-batch set consists of a total of 1000 $\mathcal{G} = (\mathcal{M}, \mathcal{K}, H)$ samples. Here, the number of mini-batch sets is assumed to be 1000, but this may be set to a different value depending on the implementation method. In other words, it may be determined by the number of mini-batch sets, which is a specific preset value.

As will be described below, in FIG. 13, performance verification may be performed after mini-batch learning for every 1000 samples. For this purpose, a validation data set may be prepared separately from the training data set. As described above, when the configuration of the training data set and the verification data set is completed, $U_{Best}$, $n_{EP}$, and $n_{MB}$ may be initialized as $U_{Best} = n_{EP} = n_{MB} = 0$, and the BGNN training parameter $\Theta$ may be also initialized. Here, $U_{Best}$ is a reference value for comparing a performance verification result after mini-batch learning, and its value is initialized to 0, and is updated to a better performance verification value when the better performance verification value is derived. $n_{EP}$ and $n_{MB}$ are variables that monitor the number of trainings and indicate the number of elapsed epochs and the number of mini-batch sets, respectively.

In a step S1310, an optional storing operation of the parameter set $\Theta$ may be performed in the mini-batch learning and training epoch. First, the number $n_{MB}$ of mini-batch sets may be increased by 1. In the previous initialization operation, the number $n_{MB}$ of mini-batch sets is initialized to 0, so the first operation may be an operation for the first mini-batch set. By performing the BGNN learning using mini-batch data, the parameter set $\Theta$ may be updated in the training epoch. $U_{Val}$ may then be derived by constructing independent verification samples. If the derived $U_{Val}$ is greater than or equal to $U_{Best}$, the parameter set $\Theta$ may be stored and $U_{Best}$ may be updated to $U_{Val}$.

The training of the BGNN with random bipartite graphs, which is the operation of step S1310, may be considered a dropout technique in which hidden neurons in one DNN are randomly removed during training. The training strategy according to the present disclosure stochastically activates vertex DNNs and their edge connections according to the training samples $\mathcal{G}$. By doing so, it is possible to perform a model operation that averages over multiple network configurations, which can improve the ability of the trained BGNN to generalize to unknown network configurations.

In Equation 20, a sample mean of a gradient may be calculated through a backpropagation algorithm. In each mini-batch (of 1000 $\mathcal{G}$ samples) training, the verification objective value, denoted as $U_{Val}$, may be evaluated for independently generated verification samples. Then, the parameter $\Theta$ may be stored and $U_{Best}$ may be updated to $U_{Val}$ whenever better verification performance is obtained.

In a step S1320, it may be checked whether the number $N_{MB}$ of mini-batch sets and the elapsed mini-batch set count value $n_{MB}$ are the same. If the mini-batch set count value is the same as the number of mini-batch sets, training for all mini-batch sets may be completed. If the mini-batch set count value is not equal to the number of mini-batch sets, step S1310 may be performed repeatedly.

In a step S1330, it may be checked whether the epoch count value $n_{EP}$ is equal to the number $N_{EP}$ of all epochs. If the epoch count value is equal to the number of all epochs, all mini-batch learning and training of all epochs may be completed. If the epoch count value is not equal to the number of all epochs, the process may proceed to a step S1340.

When a specific mini-batch training is completed in the step S1340, the process of the step S1310 may be iterated by increasing the number of epochs. Therefore, the epoch count value may be increased by 1, and the mini-batch set count value may be initialized back to zero.

The training strategy proposed in the present disclosure may be classified as unsupervised learning because it does not depend on labels, i.e. the optimal values of Equation 4. Therefore, the DNNs in Equation 16 may learn appropriate beamforming rules on their own instead of remembering known suboptimal points as in supervised learning methods.

In general, the training process described above may be executed offline. The BGNN that has been trained and verified may be applied to an actual system and calculated as linear matrix products presented in Equation 15. In particular, the BGNN proposed in the present disclosure has the advantage of being applicable regardless of the network size of the system. That is, in case of multi-user beamforming in the single base station multi-antenna system as shown in FIG. 3A, the BGNN may be deployed at the base station and may operate regardless of the actual number of antennas of the base station and the number of users present in the system.

Meanwhile, the BGNN according to the present disclosure may be applied to a system through distributed and parallel implementation in case of multi-user beamforming through cooperations of distributed APs in the distributed MIMO system as shown in FIG. 1B.

The system application through distributed and parallel implementation of the BGNN according to the present disclosure will be described with reference to FIGS. 14A, 14B, and 15.

Figure 14A:
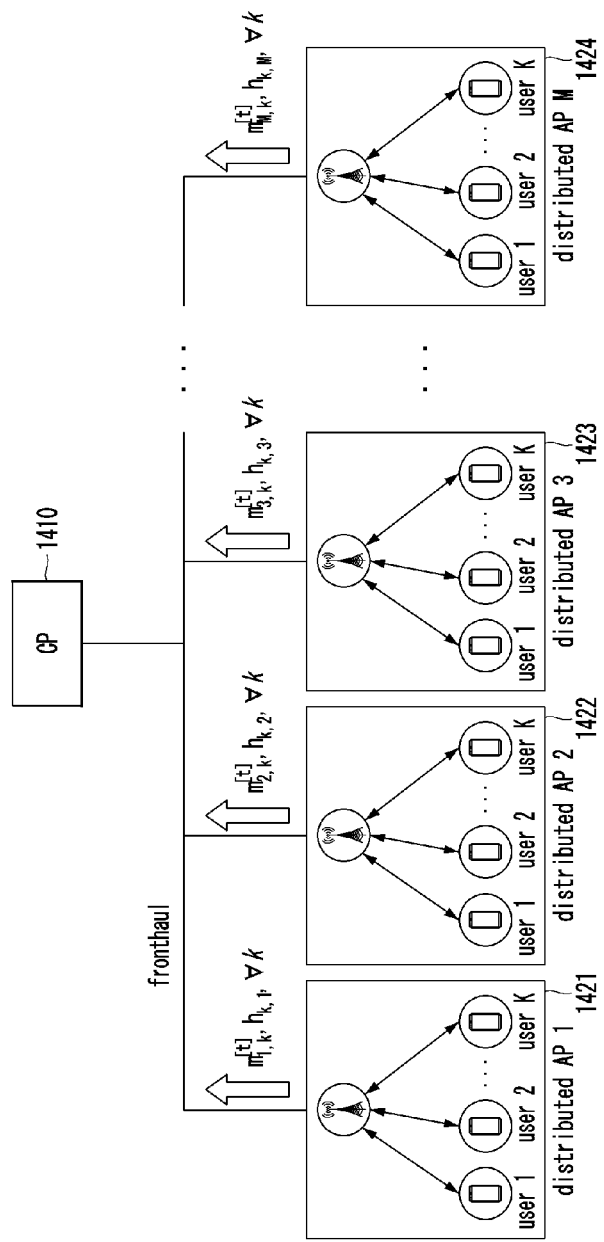
FIG. 14A is an exemplary diagram of an implementation of a BGNN on homogeneous distributed APs each having a single antenna.
Figure 14B:
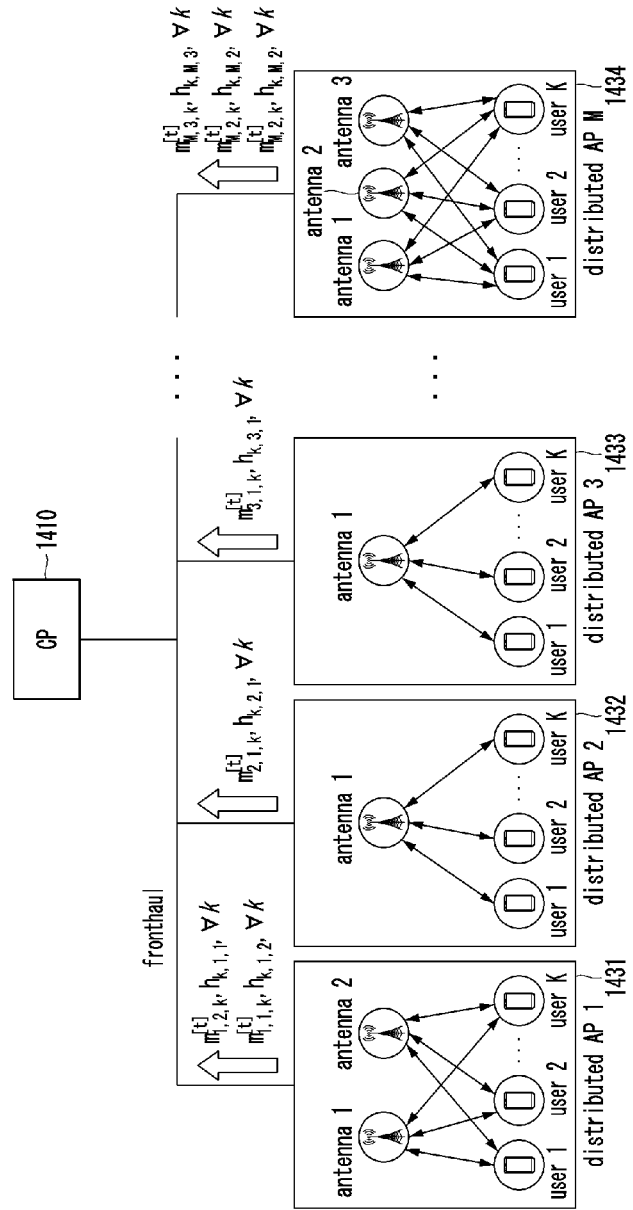
FIG. 14B is an exemplary diagram of an implementation of a BGNN on heterogeneous distributed APs having different antennas.

FIG. 14A is an exemplary diagram of an implementation of a BGNN on homogeneous distributed APs each having a single antenna, and FIG. 14B is an exemplary diagram of an implementation of a BGNN on heterogeneous distributed APs having different antennas.

In both cases of FIGS. 14A and 14B, the basic DNNs of the BGNN presented through the present disclosure may be deployed in individual APs, respectively. The basic DNNs of the BGNN presented through the present disclosure may the same as the examples of FIG. 8 described above.

First, referring to FIG. 14A, a central processor (CP) 1410 and distributed APs 1421, 1422, 1423, . . . , and 1424 are illustrated. A case where each of the distributed APs 1421, 1422, 1423, . . . , and 1424 communicates with K users is illustrated. The distributed APs 1421, 1422, 1423, . . . , and 1424 may be connected through fronthaul inks, and the distributed APs 1421, 1422, 1423, . . . , and 1424 and the CP 1410 may be connected through fronthaul links.

In the case of FIG. 14A having the above-described configuration, a bipartite graph consisting of an antenna vertex of the distributed AP and vertices of all users may be configured for each distributed AP. Each of the above-described distributed APs 1421, 1422, 1423, . . . , and 1424 may deliver information $m_{m,k}^{[t]}$, $h_{k,m}$, $\forall k$ related to itself to other distributed APs through fronthaul links. Through this, an entire bipartite graph consisting of all distributed APs and all users may be constructed. In addition, through this, BMP inference may be performed through the BGNN.

Referring to FIG. 14b, the CP 1410 and distributed APs 1431, 1432, 1433, . . . , and 1434 are illustrated in the same manner as in FIG. 14A. A case where each of the distributed APs 1431, 1432, 1433, . . . , and 1434 communicates with K users is illustrated. A difference between FIGS. 14A and 14B is that the case of FIG. 14A is a case where one distributed AP has a single antenna, but the case of FIG. 14B is a case where the distributed APs 1432 and 1433 each have a single antenna and the distributed APs 1431 and 1434 each have multiple antennas. The distributed APs 1431, 1432, 1433, . . . , and 1434 may be connected through fronthaul links, and the distributed APs 1431, 1432, 1433, . . . , and 1434 and the CP 1410 may be connected through fronthaul links.

In the case of FIG. 14b described above, information a plurality of antenna vertices belonging to a distributed AP may be shared through the fronthaul links, and through this, BMP inference may be performed through the BGNN. Whenever the network configuration change, that is, when the number of distributed APs and/or users changes, distributed implementation of the BGNN may be made possible by simply adding or removing the basic DNNs of the BGNN shown in FIG. 8.

Therefore, in the case of configuration as shown in FIGS. 14A and 14B, each AP may configure antenna message generation DNNs corresponding to the number of its antennas, configure user message generation DNNs corresponding to the number of users communicating with itself, and configure beam characteristic generation DNN corresponding to the number of users communicating with itself. The beam characteristic may be obtained through the procedures of FIG. 6 and/or FIGS. 9 to 11 described above using the configured antenna message generation DNN(s), user message generation DNN(s), and beam characteristic generation DNN(s). Then, a beamforming vector may be calculated using the obtained beam characteristics. In addition, training of beam characteristics for beamforming vector calculation may be performed offline in advance, or may be performed in real time based on the method described in FIG. 13.

In addition, based on the above description, when the number of users changes, the DNNs related to the users of the BGNN, that is, the user message generation DNN(s) and the beam characteristic generation DNN(s), may be updated based on the number of users. Conversely, when the number of antennas changes due to power saving of the AP(s) or failure of the AP(s), the antenna message generation DNNs may be updated based on the number of antennas. When implementing the BGNN according to the present disclosure in the above-described manner, it is easy to cope with changes in the number of users and the number of antennas.

The antenna message generation DNN, user message generation DNN, and beam characteristic generation DNN described above may be implemented using the processor 210 described in FIG. 2 or a separate processing device.

Figure 15:
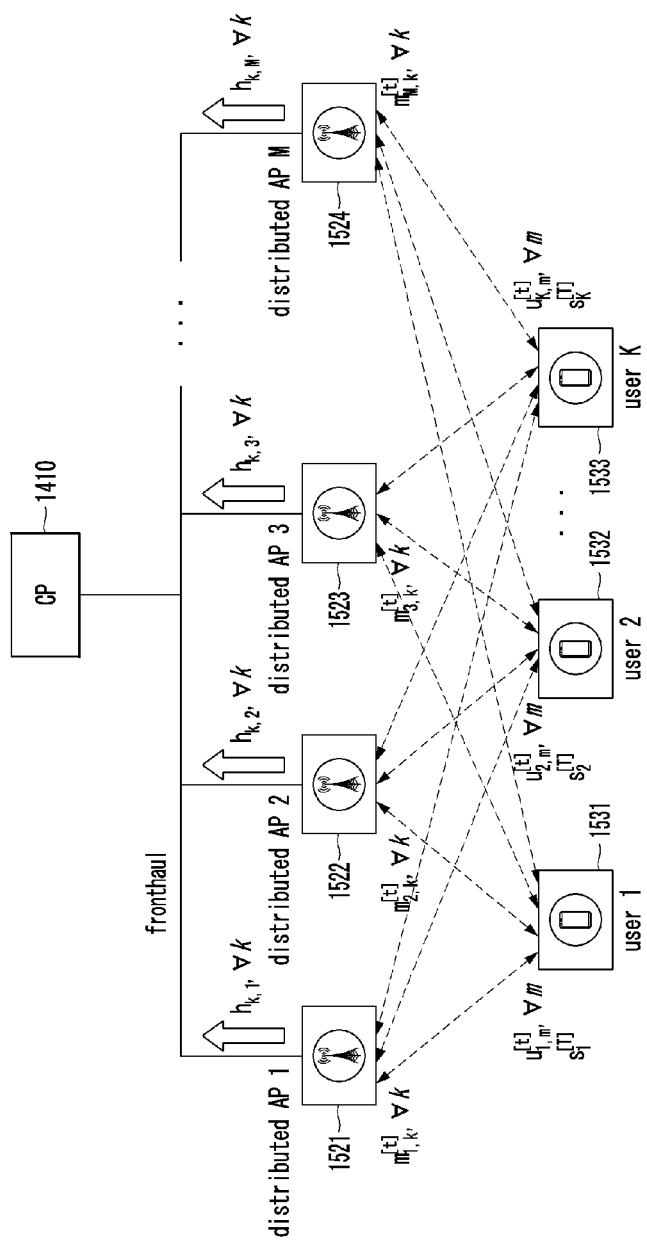
FIG. 15 is an exemplary diagram of a distributed and parallel implementation of a BGNN on distributed APs and user nodes according to an exemplary embodiment of the present disclosure.

FIG. 15 is an exemplary diagram of a distributed and parallel implementation of a BGNN on distributed APs and user nodes according to an exemplary embodiment of the Referring to FIG. 15, a plurality of distributed APs 1521, 1522, 1523, . . . , and 1524 may be mutually connected through fronthaul links under one CP 1410. In addition, in FIG. 15, it is assumed that the number of distributed APs 1521, 1522, 1523, . . . , and 1524 is M. Users 1531, 1532, . . . , and 1533 may communicate with the plurality of distributed APs 1521, 1522, 1523, . . . , and 1524. In FIG. 15, it is assumed that the number of users 1531, 1532, . . . , and 1533 is K.

In the configuration of FIG. 15, the BGNN may be implemented by simply adding or removing the basic DNN modules described in FIG. 8 whenever the network configuration changes as described in FIGS. 14A and 14B. For real-time beamforming optimization, the distributed APs and users may participate in a collaborative decision process using BMP inference presented in FIG. 6.

Channel coefficients $\{h_{k,m}: \forall k \in \mathcal{K}, \forall m \in \mathcal{M}\}$ may be obtained through standard channel estimation procedures. With the help of channel reciprocity or feedback mechanism, a channel $h_{k,m}$ on between an antenna m and a user k may be obtained at the associated antenna m and user k. The user k may generate a user message $u_{k,m}^{[t]}$ and deliver the generated user message to the intended antenna m through a reliable control channel. After receiving all uplink user messages $u_{k,m}^{[t]}$, $\forall k \in \mathcal{K}$, the antenna m may generate its antenna combined message vectors $m_{m,k}^{[t]}$, and deliver them to the relevant users. These messages may be utilized as control signals exchanged between the antennas and users to recursively calculate beam characteristics. However, a final beam characteristic decision message $s_k^{[T]}$ that is finally determined may need to be fed back to the base station to recover the beamforming vector W.

According to FIG. 15 using the BGNN technique according to the present disclosure, beamforming calculation tasks may be processed in parallel as being distributed to individual antennas and users. As a result, the online computational complexity of the trained BGNN may be generally much lower than that of the existing centralized downlink methods and classical optimization techniques.

Therefore, when configured as shown in FIG. 15, each AP may configure the antenna message generation DNNs corresponding to the number of its antennas. Each user node (e.g., UE) communicating with the AP may configure a user message generation DNN and a beam characteristic generation DNN.

In this case, training of parameters of each DNN may be performed in advance offline, or may be performed in real time based on the method described in FIG. 13. In the case of FIG. 15, each user node may calculate the optimal beamforming vector. However, when taking the form of FIG. 15, each user node should deliver the calculated optimal beamforming vector to the AP. However, in the case of FIG. 15, compared to the case of FIGS. 14A and 14B in which all calculations are performed in the AP, there is an advantage in that the load on the AP is reduced.

The present disclosure described above may provide the BGNN framework for processing scalable beamforming tasks with randomly configured antennas and users. The wireless beamforming system may be analyzed with a weighted bipartite graph, and in the weighted bipartite graph, two separate vertex sets respectively consisting of antennas and users interact through edges weighted by channel fading coefficients. BMP inference is derived to generate a beamforming solution that converges for an arbitrary bipartite graph, and may be implemented through a BGNN.

The BGNN according to the present disclosure may be composed of three types of reusable component DNNs that characterize calculation processes of antenna vertices and user vertices. Changes in configurations of antennas and users can be easily reflected in the BGNN by removing or adding the corresponding DNN modules. In particular, the BGNN according to the present disclosure has dimensionality-invariant calculation characteristics so that it can be universally applied to any communication system. In addition, such the universal characteristics can be further improved using a proposed training policy for including multiple random bipartite graphs as training samples. According to the present disclosure, real-time beamforming optimization is made possible even for any wireless network that is not used for training, and can also be applied to a distributed MIMO system.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of an access point (AP), comprising:
constructing a bipartite graph neural network (BGNN) constituting antenna message generation deep neural networks (DNNs) corresponding to a number of antennas of the AP, user message generation DNNs corresponding to a number of users communicating with the AP, and beam characteristic generation DNNs corresponding to the number of users;
a first step of providing, by each of the user message generation DNNs and to the antenna message generation DNNs, a first message including beam characteristic-related information of a reception beam received at the antenna of the AP;
a second step of providing, by each of the antenna message generation DNNs and to the beam characteristic generation DNNs, a second message including first information based on the first message and beam characteristic-related information of a transmission beam;
a third step of determining, by each of the beam characteristic generation DNNs, beam characteristics for each of the users based on the second message; and
performing beamforming to each of the users based on the determined beam characteristics.

2. The method according to claim 1, wherein the first to third steps are iterated a predetermined number of times.

3. The method according to claim 1, wherein the first message includes information related to past beam characteristics, information related to the second message in past, and information on a wireless link propagation gain between a specific antenna and a specific user.

4. The method according to claim 1, wherein the first information is a value calculated by summing all the first messages received from the users.

5. The method according to claim 1, wherein the second message includes second information related to a transmission beam between a specific antenna among the antennas of the AP and a specific user among the users, and third information related to transmission beams toward all users other than the specific user.

6. The method according to claim 1, further comprising: training the BGNN, wherein the training of the BGNN comprises:
- determining a network size based on the number of antennas of the AP and the number of users;
- constructing a mini-batch set based on a product of a number of training epochs and a number of mini-batches used in one epoch;
- performing learning using the BGNN for each mini-batch in the mini-batch set; and
- updating the respective DNNs of the BGNN based on a result of the learning.

7. The method according to claim 1, wherein parameters of all DNNs constituting the BGNN are set to values pre-trained offline.

8. The method according to claim 1, further comprising: when the number of users communicating with the AP changes, updating the user message generation DNNs and the beam characteristic generation DNNs based on the number of users.

9. The method according to claim 1, further comprising: when the number of antennas of the AP changes, updating the number of antenna message generation DNNs based on the changed number of antennas.

10. A method of a terminal, comprising:
- constructing a user message generation deep neural network (DNN) and a beam characteristic generation DNN of a bipartite graph neural network (BGNN) having distributed access points (APs) as vertices on one side and terminals as vertices on another side;
- a first step of transmitting, by the user message generation DNN and to the APs, a first message including beam characteristic-related information of each of reception beams received from the APs;
- a second step of receiving, from the APs, a second message including first information based on the first message and beam characteristic-related information of transmission beams; and
- determining, by the beam characteristic generation DNN, beam characteristics based on the second message,
- wherein the APs constituting the BGNN includes antenna message generation DNNs corresponding to a number of antennas of the APs, respectively.

11. The method according to claim 10, further comprising: transmitting the determined beam characteristics to the APs.

12. The method according to claim 10, wherein the beam characteristics are determined by iterating the first step and the second step a preset number of times.

13. The method according to claim 10, wherein the first message includes information related to past beam characteristics, information related to the second message in past, and information on a wireless link propagation gain between a specific antenna and a specific user.

14. The method according to claim 10, wherein the second message includes second information related to a transmission beam between a specific antenna among the antennas of the AP and a specific user among the users, and third information related to transmission beams toward all users other than the specific user.

15. A method of an access point (AP), comprising:
- constructing an antenna message generation deep neural network (DNN) of a bipartite graph neural network (BGNN) having terminals as vertices on one side and APs including the AP and communicating with the terminals as vertices on another side;
- receiving, from each of the terminals, a first message including beam characteristic-related information of a reception beam of the each of the terminals;
- transmitting, by the antenna message generation DNN and to each of the terminals, a second message including first information based on the first message and beam characteristic-related information of a transmission beam;
- receiving beam characteristic information from each of the terminals; and
- performing beamforming for each of the terminals based on the beam characteristic information,
- wherein each of the terminals includes a user message generation DNN and a beam characteristic generation DNN constituting the BGNN.

16. The method according to claim 15, wherein the first message includes information related to past beam characteristics, information related to the second message in past, and information on a wireless link propagation gain between a specific antenna and a specific user, and the first information is a value calculated by summing all the first messages received from the users.

17. The method according to claim 15, wherein the second message includes second information related to a transmission beam between an antenna of the AP and a specific user among the users, and third information related to transmission beams toward all users other than the specific user.

18. The method according to claim 15, further comprising: when a number of antennas of the AP changes, updating the number of antenna message generation DNNs based on the changed number of antennas.

* * * * *